(12) United States Patent
Tuller et al.

(10) Patent No.: US 10,314,457 B2
(45) Date of Patent: Jun. 11, 2019

(54) FILTER WITH ARTIFICIAL BOUNDARY FOR A DISHWASHING MACHINE

(71) Applicant: WHIRLPOOL CORPORATION, Benton Harbor, MI (US)

(72) Inventors: Barry E. Tuller, Stevensville, MI (US); Rodney M. Welch, Eau Claire, MI (US); Anthony B. Welsh, Saint Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 16/217,596

(22) Filed: Dec. 12, 2018

(65) Prior Publication Data

US 2019/0110659 A1 Apr. 18, 2019

Related U.S. Application Data

(63) Continuation of application No. 15/692,193, filed on Aug. 31, 2017, now Pat. No. 10,178,939, which is a continuation of application No. 14/503,678, filed on Oct. 1, 2014, now Pat. No. 9,861,251, which is a continuation-in-part of application No. 13/164,501, filed on Jun. 20, 2011, now Pat. No. 9,010,344.

(51) Int. Cl.
*A47L 15/42* (2006.01)
*B01D 29/64* (2006.01)

(52) U.S. Cl.
CPC ....... *A47L 15/4206* (2013.01); *A47L 15/4219* (2013.01); *A47L 15/4225* (2013.01); *B01D 29/6476* (2013.01); *A47L 15/4208* (2013.01)

(58) Field of Classification Search
CPC .............. A47L 15/4206; A47L 15/4208; A47L 15/4219; A47L 15/4225; B01D 29/6476

USPC .................. 134/56 D, 57 D, 58 D, 110, 111
See application file for complete search history.

(56) References Cited

U.S. PATENT DOCUMENTS

| | | | |
|---|---|---|---|
| 1,617,021 A | 2/1927 | Mitchell |
| 2,044,524 A | 6/1936 | Caise |
| 2,154,559 A | 4/1939 | Bilde |
| 2,422,022 A | 6/1947 | Koertge |
| 2,726,666 A | 12/1955 | Oxford |
| 2,734,122 A | 2/1956 | Flannery |
| 3,016,147 A | 1/1962 | Cobb et al. |

(Continued)

FOREIGN PATENT DOCUMENTS

| | | |
|---|---|---|
| CH | 169630 | 6/1934 |
| CN | 2571812 | 9/2003 |

(Continued)

OTHER PUBLICATIONS

European Search Report for EP121914675, dated Dec. 5, 2012.

(Continued)

*Primary Examiner* — Levon J Shahinian
(74) *Attorney, Agent, or Firm* — McGarry Bair PC

(57) ABSTRACT

A liquid filtering system for a dishwasher, having a housing defining a filter chamber and configured to be fluidly coupled to a recirculation flow path of the dishwasher, a filter located within the filter chamber and having a first end axially spaced from a second end and defining a filter there between that has a first surface and a second surface, the filter being positioned within the recirculation flow path to filter soils from liquid flowing through the recirculation flow path as the liquid passes through the filter and a flow diverter to aid in cleaning the filter.

20 Claims, 16 Drawing Sheets

(56) References Cited

U.S. PATENT DOCUMENTS

| | | |
|---|---|---|
| 3,026,628 A | 3/1962 | Berger, Sr. et al. |
| 3,064,664 A | 11/1962 | Warhus |
| 3,068,877 A | 12/1962 | Jacobs |
| 3,103,227 A | 9/1963 | Long |
| 3,122,148 A | 2/1964 | Alabaster |
| 3,186,417 A | 6/1965 | Fay |
| 3,288,154 A | 11/1966 | Jacobs |
| 3,310,243 A | 3/1967 | Duncan et al. |
| 3,378,933 A | 4/1968 | Jenkins |
| 3,542,594 A | 11/1970 | Smith et al. |
| 3,575,185 A | 4/1971 | Barbulesco |
| 3,586,011 A | 6/1971 | Mazza |
| 3,708,120 A | 1/1973 | Camprubi et al. |
| 3,709,236 A | 1/1973 | Field et al. |
| 3,739,145 A | 6/1973 | Woehler |
| 3,801,280 A | 4/1974 | Shah et al. |
| 3,846,321 A | 11/1974 | Strange |
| 3,906,967 A | 9/1975 | Bergeson |
| 3,989,054 A | 11/1976 | Mercer |
| 4,179,307 A | 12/1979 | Cau et al. |
| 4,180,095 A | 12/1979 | Woolley et al. |
| 4,228,962 A | 10/1980 | Dingier et al. |
| 4,326,552 A | 4/1982 | Bleckmann |
| 4,346,723 A | 8/1982 | Geiger |
| 4,359,250 A | 11/1982 | Jenkins |
| 4,374,443 A | 2/1983 | Mosell |
| 4,528,097 A | 7/1985 | Ward |
| 4,754,770 A | 7/1988 | Fornasari |
| 5,002,890 A | 3/1991 | Morrison |
| 5,030,357 A | 7/1991 | Lowe |
| 5,131,419 A | 7/1992 | Roberts |
| 5,133,863 A | 7/1992 | Zander |
| 5,331,986 A | 7/1994 | Lim et al. |
| 5,427,129 A | 6/1995 | Young, Jr. et al. |
| 5,454,298 A | 10/1995 | Lu |
| 5,470,142 A | 11/1995 | Sargeant et al. |
| 5,470,472 A | 11/1995 | Baird et al. |
| 5,546,968 A | 8/1996 | Jeon et al. |
| 5,557,704 A | 9/1996 | Dennis et al. |
| 5,569,383 A | 10/1996 | Vander Ark, Jr. et al. |
| 5,601,100 A | 2/1997 | Kawakami et al. |
| 5,618,424 A | 4/1997 | Nagaoka |
| 5,630,437 A | 5/1997 | Dries et al. |
| 5,655,556 A | 8/1997 | Guerrera et al. |
| 5,673,714 A | 10/1997 | Campagnolo et al. |
| 5,711,325 A | 1/1998 | Kloss et al. |
| 5,755,244 A | 5/1998 | Sargeant et al. |
| 5,782,112 A | 7/1998 | White et al. |
| 5,803,100 A | 9/1998 | Thies |
| 5,865,997 A | 2/1999 | Isaacs |
| 5,868,937 A | 2/1999 | Back et al. |
| 5,904,163 A | 5/1999 | Inoue et al. |
| 5,924,432 A | 7/1999 | Majlessi |
| 6,053,185 A | 4/2000 | Beevers |
| 6,289,908 B1 | 9/2001 | Kelsey |
| 6,389,908 B1 | 5/2002 | Chevalier et al. |
| 6,443,091 B1 | 9/2002 | Matte |
| 6,460,555 B1 | 10/2002 | Tuller et al. |
| 6,491,049 B1 | 12/2002 | Tuller et al. |
| 6,601,593 B2 | 8/2003 | Deiss et al. |
| 6,666,976 B2 | 12/2003 | Benenson, Jr. et al. |
| 6,675,437 B1 | 1/2004 | York |
| 6,800,197 B1 | 10/2004 | Kosola et al. |
| 6,997,195 B2 | 2/2006 | Durazzani et al. |
| 7,047,986 B2 | 5/2006 | Ertle et al. |
| 7,069,181 B2 | 6/2006 | Jerg et al. |
| 7,093,604 B2 | 8/2006 | Jung et al. |
| 7,150,284 B2 | 12/2006 | Aulbers et al. |
| 7,153,817 B2 | 12/2006 | Binder |
| 7,198,054 B2 | 4/2007 | Welch |
| 7,208,080 B2 | 4/2007 | Batten et al. |
| 7,232,494 B2 | 6/2007 | Rappette |
| 7,250,174 B2 | 7/2007 | Lee et al. |
| 7,270,132 B2 | 9/2007 | Inui et al. |
| 7,319,841 B2 | 1/2008 | Bateman, III et al. |
| 7,326,338 B2 | 2/2008 | Batten et al. |
| 7,331,356 B2 | 2/2008 | VanderRoest et al. |
| 7,347,212 B2 | 3/2008 | Rosenbauer |
| 7,350,527 B2 | 4/2008 | Gurubatham et al. |
| 7,363,093 B2 | 4/2008 | King et al. |
| 7,406,843 B2 | 8/2008 | Thies et al. |
| 7,409,962 B2 | 8/2008 | Welch |
| 7,445,013 B2 | 11/2008 | VanderRoest et al. |
| 7,475,696 B2 | 1/2009 | VanderRoest et al. |
| 7,497,222 B2 | 3/2009 | Edwards et al. |
| 7,523,758 B2 | 4/2009 | VanderRoest et al. |
| 7,594,513 B2 | 9/2009 | VanderRoest et al. |
| 7,810,512 B2 | 10/2010 | Pyo et al. |
| 7,819,983 B2 | 10/2010 | Kim et al. |
| 7,896,977 B2 | 3/2011 | Gillum et al. |
| 8,038,802 B1 | 10/2011 | Tuller |
| 8,043,437 B1 | 10/2011 | Delgado et al. |
| 8,137,479 B2 | 3/2012 | VanderRoest et al. |
| 8,161,986 B2 | 4/2012 | Alessandrelli |
| 8,187,390 B2 | 5/2012 | VanderRoest et al. |
| 8,215,322 B2 | 7/2012 | Fountain et al. |
| 8,627,832 B2 | 1/2014 | Fountain et al. |
| 8,667,974 B2 | 3/2014 | Fountain et al. |
| 8,746,261 B2 | 6/2014 | Welch |
| 9,005,369 B2 | 4/2015 | Delgado et al. |
| 9,010,344 B2 | 4/2015 | Tuller et al. |
| 9,034,112 B2 | 5/2015 | Tuller et al. |
| 9,538,898 B2 | 1/2017 | Tuller et al. |
| 2002/0017483 A1 | 2/2002 | Chesner et al. |
| 2003/0037809 A1 | 2/2003 | Favaro |
| 2003/0168087 A1 | 9/2003 | Inui et al. |
| 2003/0205248 A1 | 11/2003 | Christman et al. |
| 2004/0007253 A1 | 1/2004 | Jung et al. |
| 2004/0103926 A1 | 6/2004 | Ha |
| 2004/0254654 A1 | 12/2004 | Donnelly et al. |
| 2005/0022849 A1 | 2/2005 | Park et al. |
| 2005/0133070 A1 | 6/2005 | VanderRoest et al. |
| 2006/0005863 A1 | 1/2006 | Gurubatham et al. |
| 2006/0042657 A1 | 3/2006 | Welch |
| 2006/0054549 A1 | 3/2006 | Schoendorter |
| 2006/0123563 A1 | 6/2006 | Raney et al. |
| 2006/0162744 A1 | 7/2006 | Walkden |
| 2006/0174915 A1 | 8/2006 | Hedstrom et al. |
| 2006/0236556 A1 | 10/2006 | Ferguson et al. |
| 2006/0237049 A1 | 10/2006 | Weaver et al. |
| 2006/0237052 A1 | 10/2006 | Picardat et al. |
| 2007/0006898 A1 | 1/2007 | Lee |
| 2007/0107753 A1 | 5/2007 | Jerg |
| 2007/0119478 A1 | 5/2007 | King et al. |
| 2007/0124004 A1 | 5/2007 | King et al. |
| 2007/0163626 A1 | 7/2007 | Klein |
| 2007/0186964 A1 | 8/2007 | Mason et al. |
| 2007/0246078 A1 | 10/2007 | Purtilo et al. |
| 2007/0266587 A1 | 11/2007 | Bringewatt et al. |
| 2007/0295360 A1 | 12/2007 | Jerg et al. |
| 2008/0116135 A1 | 5/2008 | Rieger et al. |
| 2008/0190464 A1 | 8/2008 | Stahlmann et al. |
| 2008/0289654 A1 | 11/2008 | Kim et al. |
| 2008/0289664 A1 | 11/2008 | Rockwell et al. |
| 2009/0095330 A1 | 4/2009 | Iwanaga et al. |
| 2009/0101182 A1 | 4/2009 | Buesing et al. |
| 2009/0283111 A1 | 11/2009 | Classen et al. |
| 2010/0012159 A1 | 1/2010 | Verma et al. |
| 2010/0043826 A1 | 2/2010 | Bertsch et al. |
| 2010/0043828 A1 | 2/2010 | Choi et al. |
| 2010/0043847 A1 | 2/2010 | Yoon et al. |
| 2010/0121497 A1 | 5/2010 | Heisele et al. |
| 2010/0147339 A1 | 6/2010 | Bertsch et al. |
| 2010/0154830 A1 | 6/2010 | Lau et al. |
| 2010/0154841 A1 | 6/2010 | Fountain et al. |
| 2010/0175762 A1 | 7/2010 | Anacrelico |
| 2010/0224223 A1 | 9/2010 | Kehl et al. |
| 2010/0252081 A1 | 10/2010 | Classen et al. |
| 2010/0300499 A1 | 12/2010 | Han et al. |
| 2011/0030742 A1 | 2/2011 | Dalsing et al. |
| 2011/0061682 A1 | 3/2011 | Fountain et al. |
| 2011/0120508 A1 | 5/2011 | Yoon et al. |
| 2011/0126865 A1 | 6/2011 | Yoon et al. |
| 2011/0146714 A1 | 6/2011 | Fountain et al. |

(56) References Cited

U.S. PATENT DOCUMENTS

| | | |
|---|---|---|
| 2011/0146730 A1 | 6/2011 | Welch |
| 2011/0146731 A1 | 6/2011 | Fountain et al. |
| 2011/0197933 A1 | 8/2011 | Yoon et al. |
| 2011/0214702 A1 | 9/2011 | Brown-West et al. |
| 2011/0240070 A1 | 10/2011 | Fadler et al. |
| 2012/0097200 A1 | 4/2012 | Fountain |
| 2012/0118330 A1 | 5/2012 | Tuller et al. |
| 2012/0118336 A1 | 5/2012 | Welch |
| 2012/0138096 A1 | 6/2012 | Tuller et al. |
| 2012/0138106 A1 | 6/2012 | Fountain et al. |
| 2012/0138107 A1 | 6/2012 | Fountain et al. |
| 2012/0167928 A1 | 7/2012 | Fountain et al. |
| 2012/0291805 A1 | 11/2012 | Tuller et al. |
| 2012/0291822 A1 | 11/2012 | Tuller et al. |
| 2012/0318295 A1 | 12/2012 | Delgado et al. |
| 2012/0318296 A1 | 12/2012 | Fountain et al. |
| 2012/0318308 A1 | 12/2012 | Fountain et al. |
| 2012/0318309 A1 | 12/2012 | Tuller et al. |
| 2013/0186437 A1 | 7/2013 | Tuller et al. |
| 2013/0186438 A1 | 7/2013 | Fountain et al. |
| 2013/0200386 A1 | 8/2013 | Jozwiak |
| 2013/0319481 A1 | 12/2013 | Welch |
| 2013/0319482 A1 | 12/2013 | Vallejo Noriega et al. |
| 2013/0319483 A1 | 12/2013 | Welch |
| 2013/0319485 A1 | 12/2013 | Blanchard et al. |
| 2014/0109938 A1 | 4/2014 | Geda et al. |
| 2014/0130829 A1 | 5/2014 | Fountain et al. |
| 2014/0230852 A1 | 8/2014 | Tuller et al. |
| 2014/0238446 A1 | 8/2014 | Welch |
| 2014/0332040 A1 | 11/2014 | Geda |

FOREIGN PATENT DOCUMENTS

| | | |
|---|---|---|
| CN | 2761660 | 3/2006 |
| CN | 1966129 | 5/2007 |
| CN | 2907830 | 6/2007 |
| CN | 101406379 | 4/2009 |
| CN | 201276653 | 7/2009 |
| CN | 201316486 | 12/2009 |
| CN | 101654855 | 2/2010 |
| CN | 201410325 | 2/2010 |
| CN | 201473770 | 5/2010 |
| DE | 1134489 | 8/1962 |
| DE | 1428358 A1 | 11/1968 |
| DE | 1453070 | 3/1969 |
| DE | 7105474 | 8/1971 |
| DE | 7237309 U | 9/1973 |
| DE | 2825242 A1 | 1/1979 |
| DE | 3337369 A1 | 4/1985 |
| DE | 3723721 A1 | 5/1988 |
| DE | 3842997 A1 | 7/1990 |
| DE | 4011834 | 10/1991 |
| DE | 4016915 A1 | 11/1991 |
| DE | 4131914 A1 | 4/1993 |
| DE | 4236931 A1 | 5/1993 |
| DE | 9415486 U1 | 11/1994 |
| DE | 9416710 U1 | 1/1995 |
| DE | 4413432 C1 | 8/1995 |
| DE | 4418523 A1 | 11/1995 |
| DE | 4433842 | 3/1996 |
| DE | 69111365 T2 | 3/1996 |
| DE | 19546965 A1 | 6/1997 |
| DE | 69403957 T2 | 1/1998 |
| DE | 19652235 | 6/1998 |
| DE | 10000772 A1 | 7/2000 |
| DE | 69605965 T2 | 8/2000 |
| DE | 19951838 A1 | 5/2001 |
| DE | 10065571 A1 | 7/2002 |
| DE | 10106514 A1 | 8/2002 |
| DE | 60206490 T2 | 5/2006 |
| DE | 60302143 | 8/2006 |
| DE | 102005023428 A1 | 11/2006 |
| DE | 102005038433 A1 | 2/2007 |
| DE | 102007007133 A1 | 8/2008 |
| DE | 102007060195 A1 | 6/2009 |
| DE | 202010006739 U1 | 9/2010 |
| DE | 102009027910 A1 | 1/2011 |
| DE | 102009028278 A1 | 2/2011 |
| DE | 102010061215 A1 | 6/2011 |
| DE | 102011052846 A1 | 5/2012 |
| DE | 102010061346 A1 | 6/2012 |
| DE | 102012103435 A1 | 12/2012 |
| EP | 0068974 A1 | 1/1983 |
| EP | 0178202 A1 | 4/1986 |
| EP | 0198496 A1 | 10/1986 |
| EP | 0208900 A2 | 1/1987 |
| EP | 0370552 A1 | 5/1990 |
| EP | 0374616 A1 | 6/1990 |
| EP | 0383028 A2 | 8/1990 |
| EP | 0405627 A1 | 1/1991 |
| EP | 437189 A1 | 7/1991 |
| EP | 0454640 A1 | 10/1991 |
| EP | 0521815 A1 | 1/1993 |
| EP | 0524102 A1 | 1/1993 |
| EP | 0585905 A2 | 3/1994 |
| EP | 0597907 A1 | 5/1994 |
| EP | 0702928 A1 | 8/1995 |
| EP | 0725182 A1 | 8/1996 |
| EP | 0748607 A2 | 12/1996 |
| EP | 752231 A1 | 1/1997 |
| EP | 0752231 A1 | 1/1997 |
| EP | 0854311 A2 | 7/1998 |
| EP | 0855165 A2 | 7/1998 |
| EP | 0898928 A1 | 3/1999 |
| EP | 0943281 A2 | 9/1999 |
| EP | 1029965 A1 | 8/2000 |
| EP | 1224902 A2 | 7/2002 |
| EP | 1256308 A2 | 11/2002 |
| EP | 1264570 | 12/2002 |
| EP | 1277430 A1 | 1/2003 |
| EP | 1319360 A1 | 6/2003 |
| EP | 1342827 | 9/2003 |
| EP | 1346680 A2 | 9/2003 |
| EP | 1386575 A1 | 2/2004 |
| EP | 1415587 | 5/2004 |
| EP | 1498065 A1 | 1/2005 |
| EP | 1583455 A1 | 10/2005 |
| EP | 1728913 A2 | 12/2006 |
| EP | 1743871 A1 | 1/2007 |
| EP | 1862104 A1 | 12/2007 |
| EP | 1882436 A1 | 1/2008 |
| EP | 1980193 A1 | 10/2008 |
| EP | 2075366 A1 | 1/2009 |
| EP | 2127587 A1 | 12/2009 |
| EP | 2138087 A1 | 12/2009 |
| EP | 1703834 B1 | 2/2011 |
| EP | 2332457 A1 | 6/2011 |
| EP | 2335547 A1 | 6/2011 |
| EP | 2338400 A1 | 6/2011 |
| EP | 2351507 A1 | 8/2011 |
| FR | 1370521 A1 | 8/1964 |
| FR | 2372363 A1 | 6/1978 |
| FR | 2491320 A1 | 4/1982 |
| FR | 2491321 A1 | 4/1982 |
| FR | 2790013 A1 | 8/2000 |
| GB | 1123789 A | 8/1964 |
| GB | 973859 A | 10/1964 |
| GB | 1047948 | 11/1966 |
| GB | 1515095 | 6/1978 |
| GB | 2274772 A | 8/1994 |
| JP | 55039215 A | 3/1980 |
| JP | 60069375 A | 4/1985 |
| JP | 61085991 A | 5/1986 |
| JP | 61200824 A | 9/1986 |
| JP | 1005521 A2 | 1/1989 |
| JP | 1080331 A | 3/1989 |
| JP | 5245094 A | 9/1993 |
| JP | 07178030 | 7/1995 |
| JP | 9164107 A | 6/1997 |
| JP | 10109007 A | 4/1998 |
| JP | 10243910 A | 9/1998 |
| JP | 11076127 A | 3/1999 |
| JP | 2000107114 A | 4/2000 |
| JP | 2001190479 A | 7/2001 |

(56) References Cited

FOREIGN PATENT DOCUMENTS

| | | | |
|---|---|---|---|
| JP | 2001190480 A | 7/2001 |
| JP | 2003336909 A | 12/2003 |
| JP | 2003339607 A | 12/2003 |
| JP | 2004113683 A | 4/2004 |
| JP | 2004267507 A | 9/2004 |
| JP | 2005124979 A | 5/2005 |
| JP | 2006075635 A | 3/2006 |
| JP | 2007068601 A | 3/2007 |
| JP | 2008093196 A | 4/2008 |
| JP | 2008253543 A | 10/2008 |
| JP | 2008264018 A | 11/2008 |
| JP | 2008264724 A | 11/2008 |
| JP | 2010035745 A | 2/2010 |
| JP | 2010187796 A | 9/2010 |
| JP | 5184514 B2 | 4/2013 |
| KR | 20010077128 A | 8/2001 |
| KR | 20060029567 A | 4/2006 |
| KR | 20090006659 A | 1/2009 |
| KR | 20090061479 A1 | 6/2009 |
| KR | 20100037453 A | 4/2010 |
| WO | 2005058124 A1 | 6/2005 |
| WO | 2005060813 A1 | 7/2005 |
| WO | 2005115216 A1 | 12/2005 |
| WO | 2007024491 A2 | 3/2007 |
| WO | 2007074024 A1 | 7/2007 |
| WO | 2008067898 A1 | 6/2008 |
| WO | 2008125482 A2 | 10/2008 |
| WO | 2009018903 A1 | 2/2009 |
| WO | 2009065696 A1 | 5/2009 |
| WO | 2009077266 A1 | 6/2009 |
| WO | 2009077279 A1 | 6/2009 |
| WO | 2009077280 A1 | 6/2009 |
| WO | 2009077283 A1 | 6/2009 |
| WO | 2009077286 A1 | 6/2009 |
| WO | 2009077290 A1 | 6/2009 |
| WO | 2009118308 A1 | 10/2009 |
| WO | 2010073185 A1 | 7/2010 |

OTHER PUBLICATIONS

European Search Report for EP11188106, dated Mar. 29, 2012.
European Search Report for EP12188007, dated Aug. 6, 2013.
German Search Report for DE102010061347, dated Jan. 23, 2013.
German Search Report for DE102010061215, dated Feb. 7, 2013.
German Search Report for DE102010061346, dated Sep. 30, 2011.
German Search Report for DE102010061343, dated Jul. 7, 2011.
German Search Report for DE102011053666, dated Oct. 21, 2011.
German Search Report for DE102013103264, dated Jul. 12, 2013.
German Search Report for DE102013103625, dated Jul. 19, 2013.
German Search Report for Counterpart DE102013109125, dated Dec. 9, 2013.
German Search Report for DE102010061342, dated Aug. 19, 2011.
German Search Report for DE1020141017242, dated Apr. 26, 2016.
European Search Report for EP101952380, dated May 19, 2011.
Ishihara et al., JP 11155792 A, English Machine Translation, 1999, pp. 1-14.
German Search Report for Counterpart DE102014101260.7, dated Sep. 18, 2014.

FILTER WITH ARTIFICIAL BOUNDARY FOR A DISHWASHING MACHINE

CROSS-REFERENCE TO RELATED APPLICATIONS

This application is a continuation of U.S. application Ser. No. 15/692,193, filed Aug. 31, 2017 which is a continuation of U.S. application Ser. No. 14/503,678, filed Oct. 1, 2014, now U.S. Pat. No. 9,861,251, which is a continuation-in-part of U.S. application Ser. No. 13/164,501, filed Jun. 20, 2011, now U.S. Pat. No. 9,010,344, issued Apr. 21, 2015, and entitled Rotating Filter for a Dishwashing Machine, all of which are incorporated by reference herein in their entirety.

BACKGROUND

A dishwashing machine is a domestic appliance into which dishes and other cooking and eating wares (e.g., plates, bowls, glasses, flatware, pots, pans, bowls, etc.) are placed to be washed. A dishwashing machine includes various filters to separate soil particles from wash liquid during the recirculation of the sprayed wash liquid.

BRIEF DESCRIPTION

An aspect of the present disclosure relates to a dishwasher including a tub at least partially defining a treating chamber, a liquid spraying system configured to supply at least one spray of liquid into the treating chamber, a liquid recirculation system fluidly coupling the treating chamber to the liquid spraying system and defining a recirculation flow path, a liquid filtering system, a housing defining an enclosed filter chamber and configured to be fluidly coupled to the recirculation flow path, a filter located within the housing and having a first end axially spaced from a second end, where the second end is larger in diameter than the first end, and defines a cone-shaped filter that encloses a hollow interior, the filter having a first surface and a second surface, the filter being positioned within the recirculation flow path to filter soils from liquid flowing through the recirculation flow path as the liquid passes through the filter from the first surface to the second surface and where the filter fluidly divides the filter chamber into a first part that contains filtered soil particles and a second part that excludes filtered soil particles, and a flow diverter spaced apart from one of the first surface or the second surface to define a gap through which at least some of the liquid passes as the liquid flows through the recirculation flow path.

DETAILED DESCRIPTION

Figure 1:
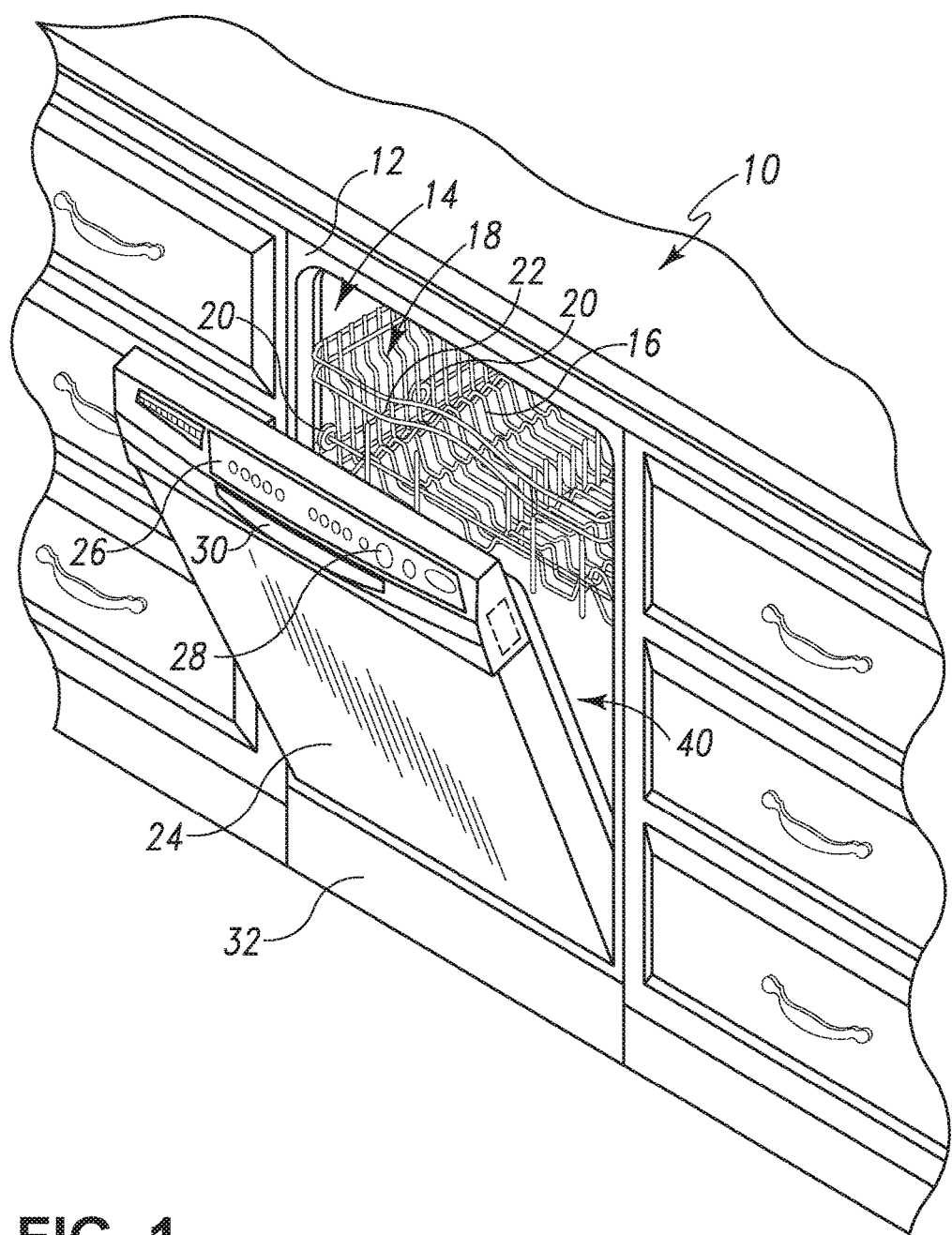
FIG. 1 is a perspective view of a dishwashing machine.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of present disclosure as defined by the appended claims. For example, while the present invention is described in terms of a conventional dishwashing unit, it could also be implemented in other types of dishwashing units, such as in-sink dishwashers or drawer-type dishwashers.

Referring to FIG. 1, a dishwashing machine 10 (hereinafter dishwasher 10) is shown. The dishwasher 10 has a tub 12 that at least partially defines a treating chamber 14 into which a user may place dishes and other cooking and eating wares (e.g., plates, bowls, glasses, flatware, pots, pans, bowls, etc.) to be washed. The dishwasher 10 includes a number of racks 16 located in the tub 12. An upper dish rack 16 is shown in FIG. 1, although a lower dish rack is also included in the dishwasher 10. A number of roller assemblies 18 are positioned between the dish racks 16 and the tub 12. The roller assemblies 18 allow the dish racks 16 to extend from and retract into the tub 12, which facilitates the loading and unloading of the dish racks 16. The roller assemblies 18 include a number of rollers 20 that move along a corresponding support rail 22.

A door 24 is hinged to the lower front edge of the tub 12. The door 24 permits user access to the tub 12 to load and unload the dishwasher 10. The door 24 also seals the front of the dishwasher 10 during a wash cycle. A control panel 26 is located at the top of the door 24. The control panel 26 includes a number of controls 28, such as buttons and knobs, which are used by a controller (not shown) to control the operation of the dishwasher 10. A handle 30 is also included in the control panel 26. The user may use the handle 30 to unlatch and open the door 24 to access the tub 12.

Figure 2:
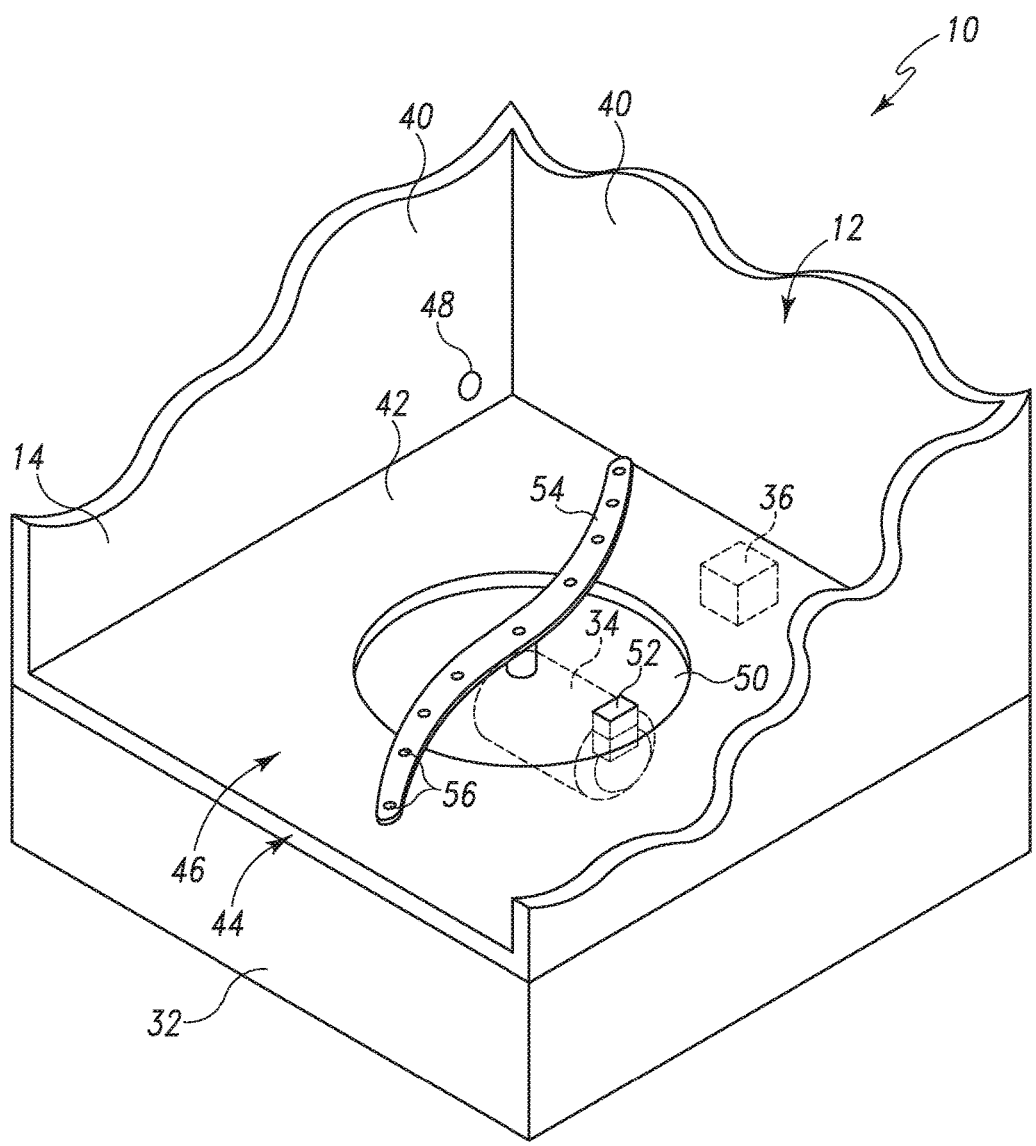
FIG. 2 is a fragmentary perspective view of the tub of the dishwashing machine of FIG. 1.

A machine compartment 32 is located below the tub 12. The machine compartment 32 is sealed from the tub 12. In other words, unlike the tub 12, which is filled with liquid and exposed to spray during the wash cycle, the machine compartment 32 does not fill with liquid and is not exposed to spray during the operation of the dishwasher 10. Referring now to FIG. 2, the machine compartment 32 houses a recirculation pump assembly 34 and the drain pump 36, as well as the dishwasher's other motor(s) and valve(s), along with the associated wiring and plumbing. The recirculation pump 36 and associated wiring and plumbing form a liquid recirculation system.

Referring now to FIG. 2, the tub 12 of the dishwasher 10 is shown in greater detail. The tub 12 includes a number of side walls 40 extending upwardly from a bottom wall 42 to define the treating chamber 14. The open front side 44 of the tub 12 defines an access opening 46 of the dishwasher 10. The access opening 46 provides the user with access to the dish racks 16 positioned in the treating chamber 14 when the door 24 is open. When closed, the door 24 seals the access opening 46, which prevents the user from accessing the dish racks 16. The door 24 also prevents liquid from escaping through the access opening 46 of the dishwasher 10 during a wash cycle.

The bottom wall 42 of the tub 12 has a sump 50 positioned therein. At the start of a wash cycle, liquid enters the tub 12 through a hole 48 defined in the side wall 40. The sloped configuration of the bottom wall 42 directs liquid into the sump 50. The recirculation pump assembly 34 removes such water and/or wash chemistry from the sump 50 through a hole 52 defined in the bottom of the sump 50 after the sump 50 is partially filled with liquid.

The liquid recirculation system supplies liquid to a liquid spraying system, which includes a spray arm 54, to recirculate the sprayed liquid in the tub 12. The recirculation pump assembly 34 is fluidly coupled to a rotating spray arm 54 that sprays water and/or wash chemistry onto the dish racks 16 (and hence any wares positioned thereon) to effect a recirculation of the liquid from the treating chamber 14 to the liquid spraying system to define a recirculation flow path. Additional rotating spray arms (not shown) are positioned above the spray arm 54. It should also be appreciated that the dishwashing machine 10 may include other spray arms positioned at various locations in the tub 12. As shown in FIG. 2, the spray arm 54 has a number of nozzles 56. Liquid passes from the recirculation pump assembly 34 into the spray arm 54 and then exits the spray arm 54 through the nozzles 56. In the illustrative embodiment described herein, the nozzles 56 are embodied simply as holes formed in the spray arm 54. However, it is within the scope of the disclosure for the nozzles 56 to include inserts such as tips or other similar structures that are placed into the holes formed in the spray arm 54. Such inserts may be useful in configuring the spray direction or spray pattern of the liquid expelled from the spray arm 54.

After wash liquid contacts the dish racks 16, and any wares positioned in the treating chamber 14, a mixture of liquid and soil falls onto the bottom wall 42 and collects in the sump 50. The recirculation pump assembly 34 draws the mixture out of the sump 50 through the hole 52. As will be discussed in detail below, liquid is filtered in the recirculation pump assembly 34 and re-circulated onto the dish racks 16. At the conclusion of the wash cycle, the drain pump 36 removes both wash liquid and soil particles from the sump 50 and the tub 12.

Figure 3:
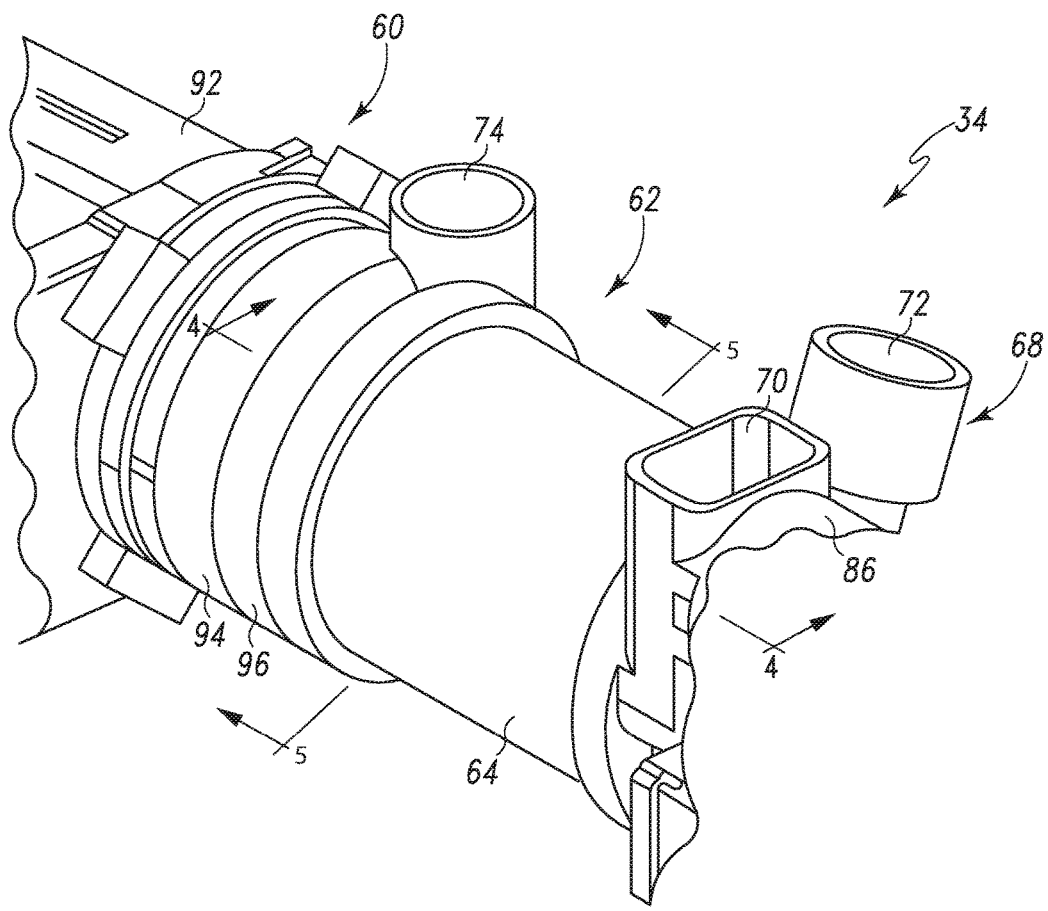
FIG. 3 is a perspective view of an embodiment of a pump and filter assembly for the dishwashing machine of FIG. 1.

Referring now to FIG. 3, the recirculation pump assembly 34 is shown removed from the dishwasher 10. The recirculation pump assembly 34 includes a wash pump 60 that is secured to a housing 62. The housing 62 includes cylindrical filter casing 64 positioned between a manifold 68 and the wash pump 60. The cylindrical filter casing 64 provides a liquid filtering system. The manifold 68 has an inlet port 70, which is fluidly coupled to the hole 52 defined in the sump 50, and an outlet port 72, which is fluidly coupled to the drain pump 36. Another outlet port 74 extends upwardly from the wash pump 60 and is fluidly coupled to the rotating spray arm 54. While recirculation pump assembly 34 is included in the dishwasher 10, it will be appreciated that in other embodiments, the recirculation pump assembly 34 may be a device separate from the dishwasher 10. For example, the recirculation pump assembly 34 might be positioned in a cabinet adjacent to the dishwasher 10. In such embodiments, a number of liquid hoses may be used to connect the recirculation pump assembly 34 to the dishwasher 10.

Figure 4:
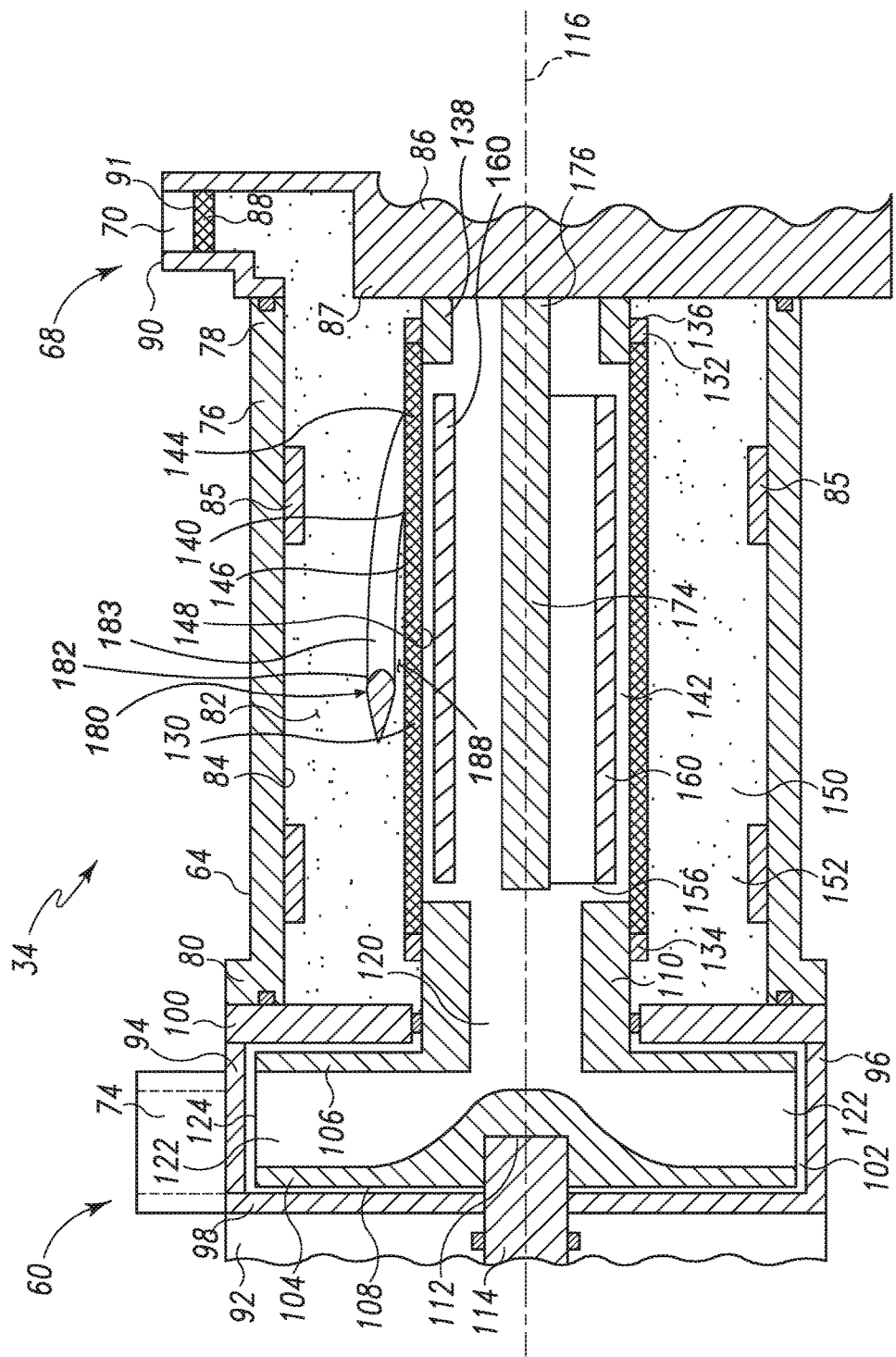
FIG. 4 is a cross-sectional view of the pump and filter assembly of FIG. 3 taken along the line 4-4 shown in FIG. 3.

Referring now to FIG. 4, a cross-sectional view of the recirculation pump assembly 34 is shown. The filter casing 64 is a hollow cylinder having a side wall 76 that extends from an end 78 secured to the manifold 68 to an opposite end 80 secured to the wash pump 60. The side wall 76 defines an interior or filter chamber 82 that extends the length of the filter casing 64. The housing 62, which defines the filter chamber 82, may be physically remote from the tub 12 such that the filter chamber 82 may form a sump that is also remote from the tub 12.

The side wall 76 has an inner surface 84 facing the filter chamber 82. A number of rectangular ribs 85 extend from the inner surface 84 into the filter chamber 82. The ribs 85 are configured to create drag to counteract the movement of liquid within the filter chamber 82. It should be appreciated that in other embodiments, each of the ribs 85 may take the form of a wedge, cylinder, pyramid, or other shape configured to create drag to counteract the movement of liquid within the filter chamber 82.

The manifold 68 has a main body 86 that is secured to the end 78 of the filter casing 64. The inlet port 70 extends upwardly from the main body 86 and is configured to be coupled to a liquid hose (not shown) extending from the hole 52 defined in the sump 50. The inlet port 70 opens through a sidewall 87 of the main body 86 into the filter chamber 82 of the filter casing 64. As such, during the wash cycle, a mixture of liquid and soil particles advances from the sump 50 into the filter chamber 82 and fills the filter chamber 82. As shown in FIG. 4, the inlet port 70 has a filter screen 88 positioned at an upper end 90. The filter screen 88 has a plurality of holes 91 extending there through. Each of the holes 91 is sized such that large soil particles are prevented from advancing into the filter chamber 82.

A passageway (not shown) places the outlet port 72 of the manifold 68 in fluid communication with the filter chamber 82. When the drain pump 36 is energized, liquid and soil particles from the sump 50 pass downwardly through the inlet port 70 into the filter chamber 82. Liquid then advances from the filter chamber 82 through the passageway and out the outlet port 72.

The wash pump 60 is secured at the opposite end 80 of the filter casing 64. The wash pump 60 includes a motor 92 (see FIG. 3) secured to a cylindrical pump housing 94. The pump housing 94 includes a side wall 96 extending from a base wall 98 to an end wall 100. The base wall 98 is secured to the motor 92 while the end wall 100 is secured to the end 80 of the filter casing 64. The walls 96, 98, 100 define an impeller chamber 102 that fills with liquid during the wash cycle. As shown in FIG. 4, the outlet port 74 is coupled to the side wall 96 of the pump housing 94 and opens into the chamber 102. The outlet port 74 is configured to receive a liquid hose (not shown) such that the outlet port 74 may be fluidly coupled to the spray arm 54.

The wash pump 60 also includes an impeller 104. The impeller 104 has a shell 106 that extends from a back end 108 to a front end 110. The back end 108 of the shell 106 is positioned in the chamber 102 and has a bore 112 formed therein. A drive shaft 114, which is rotatably coupled to the motor 92, is received in the bore 112. The motor 92 acts on the drive shaft 114 to rotate the impeller 104 about an imaginary axis 116 in a counter-clockwise direction. In this case, the axis 116 is a central axis of the filter 130. The central axis 116 may be oriented vertically or non-vertically and as illustrated, the central axis is oriented substantially horizontally. The motor 92 is connected to a power supply (not shown), which provides the electric current necessary for the motor 92 to spin the drive shaft 114 and rotate the impeller 104. In the illustrative embodiment, the motor 92 is configured to rotate the impeller 104 about the axis 116 at 3200 rpm.

The front end 110 of the impeller shell 106 is positioned in the filter chamber 82 of the filter casing 64 and has an inlet opening 120 formed in the center thereof. The shell 106 has a number of vanes 122 that extend away from the inlet opening 120 to an outer edge 124 of the shell 106. The rotation of the impeller 104 about the axis 116 draws liquid from the filter chamber 82 of the filter casing 64 into the inlet opening 120. The liquid is then forced by the rotation of the impeller 104 outward along the vanes 122. Liquid exiting the impeller 104 is advanced out of the chamber 102 through the outlet port 74 to the spray arm 54.

As shown in FIG. 4, the front end 110 of the impeller shell 106 is coupled to a rotary filter 130 positioned in the filter chamber 82 of the filter casing 64. The filter 130 has a cylindrical filter drum 132 extending from a first end 134 secured to the impeller shell 106 to a second end 136, which is axially spaced from the first end 134, rotatably coupled to a bearing 138, which is secured to the main body 86 of the manifold 68. As such, the filter 130 is operable to rotate about the axis 116 with the impeller 104.

The rotating filter 130 is located within the recirculation flow path and has an upstream surface 146 and a downstream surface 148 such that the recirculating liquid passes through the rotating filter 130 from the upstream surface 146 to the downstream surface 148 to effect a filtering of the liquid. In the described flow direction, the upstream surface 146 correlates to the outer surface and that the downstream surface 148 correlates to the inner surface. If the flow direction is reversed, the downstream surface may correlate with the outer surface and that the upstream surface may correlate with the inner surface. A filter sheet 140 extends from one end 134 to the other end 136 of the filter drum 132 and encloses a hollow interior 142. The sheet 140 includes a number of passageways 144, and each hole 144 extends from the upstream surface 146 to the downstream surface 148. In the illustrative embodiment, the sheet 140 is a sheet of chemically etched metal. Each hole 144 is sized to allow for the passage of wash liquid into the hollow interior 142 and prevent the passage of soil particles.

As such, the filter sheet 140 divides the filter chamber 82 into two parts. As wash liquid and removed soil particles enter the filter chamber 82 through the inlet port 70, a mixture 150 of liquid and soil particles is collected in the filter chamber 82 in a region 152 external to the filter sheet 140. Because the passageways 144 permit liquid to pass into the hollow interior 142, a volume of filtered liquid 156 is formed in the hollow interior 142.

A flow diverter or artificial boundary 160 is positioned in the hollow interior 142 of the filter 130. The diverter 160 may be spaced from the downstream surface 148 of the sheet 140 to form a gap there between and may be secured by a beam 174 to the housing 62. Suitable artificial flow boundaries are set forth in detail in U.S. patent application Ser. No. 12/966,420, filed Dec. 13, 2010, now U.S. Pat. No. 8,667, 974, and titled "Rotating Filter for a Dishwashing Machine," which is incorporated herein by reference in its entirety.

Figure 5:
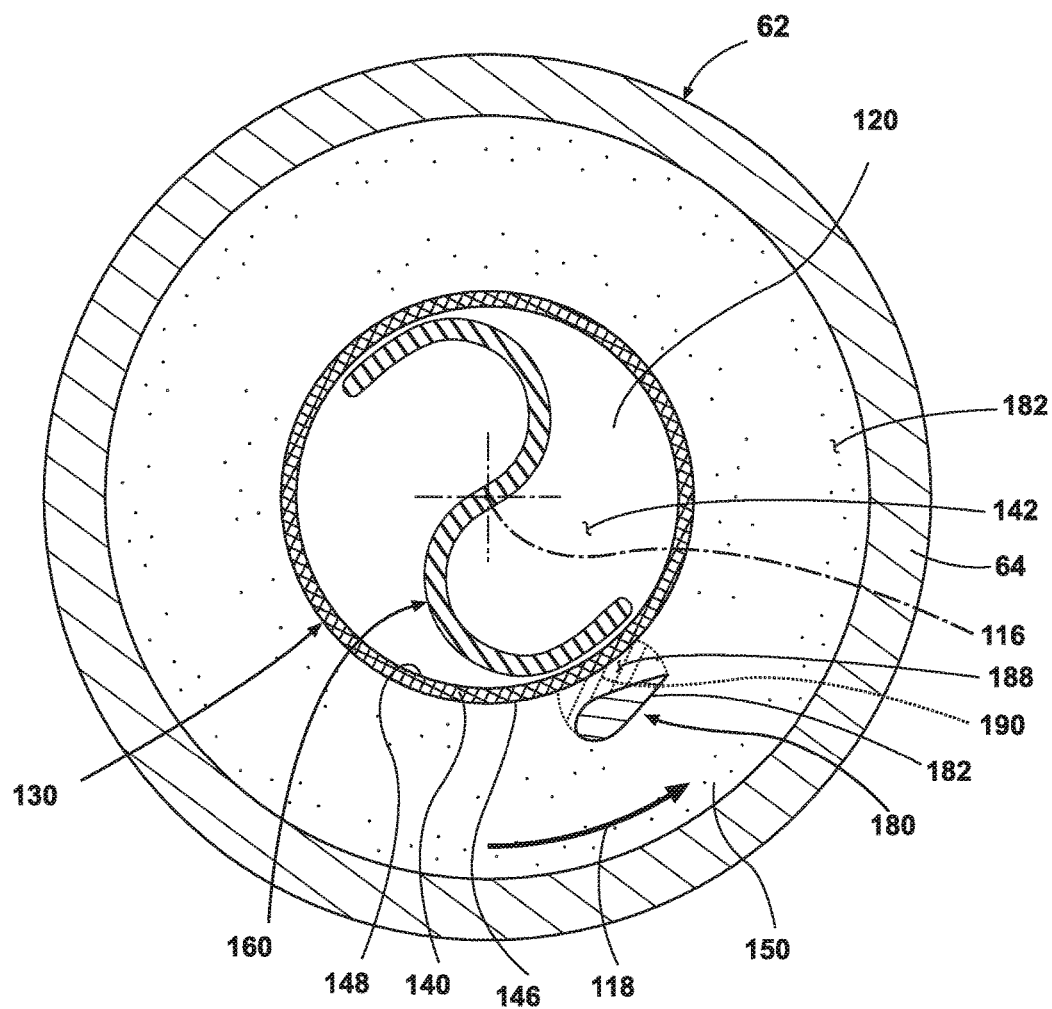
FIG. 5 is a cross-sectional view of the pump and filter assembly of FIG. 3 taken along the line 5-5 shown in FIG. 3.

Another flow diverter or artificial boundary 180 is illustrated as being positioned between the upstream surface 146 of the sheet 140 and the inner surface 84 of the housing 62. The diverter 180 has a body 182 that is spaced from at least a portion of the upstream surface 146 to form a gap 188 there between and an increased shear force zone 190 (FIG. 5). The body 182 extends along the length of the filter 130 from one end 134 to the other end 136 and has a surface 183 oriented at an angle relative to the central axis 116. The artificial boundary 180 may be positioned in a partially or completely radial overlapping relationship with the artificial boundary 160. In some cases, the shear zone benefit may be created with the artificial boundaries being in proximity to each other and not radially overlapping to any extent. The artificial boundaries 160 and 180 may have complementary shapes or cross-sections, which act to enhance the shear force benefit.

It is contemplated that the artificial boundaries may be fixed relative to the filter, as illustrated, or that they may move relative to the filter. Suitable mechanisms for moving the artificial boundary 160 and/or the artificial boundary 180 are set forth in detail in U.S. patent application Ser. No. 13/108,026, filed May 16, 2011, now U.S. Pat. No. 9,107, 559, and titled "Dishwasher with Filter Assembly," which is incorporated herein by reference in its entirety.

In operation, wash liquid, such as water and/or wash chemistry (i.e., water and/or detergents, enzymes, surfactants, and other cleaning or conditioning chemistry), enters the tub 12 through the hole 48 defined in the side wall 40 and flows into the sump 50 and down the hole 52 defined therein. As the filter chamber 82 fills, wash liquid passes through the passageways 144 extending through the filter sheet 140 into the hollow interior 142. After the filter chamber 82 is completely filled and the sump 50 is partially filled with wash liquid, the dishwasher 10 activates the motor 92.

Activation of the motor 92 causes the impeller 104 and the filter 130 to rotate. The rotation of the impeller 104 draws wash liquid from the filter chamber 82 through the filter sheet 140 and into the inlet opening 120 of the impeller shell 106. Liquid then advances outward along the vanes 122 of the impeller shell 106 and out of the chamber 102 through the outlet port 74 to the spray arm 54. When wash liquid is delivered to the spray arm 54, it is expelled from the spray arm 54 onto any dishes or other wares positioned in the treating chamber 14. Wash liquid removes soil particles located on the dishware, and the mixture of wash liquid and soil particles falls onto the bottom wall 42 of the tub 12. The sloped configuration of the bottom wall 42 directs that mixture into the sump 50 and back to the filter chamber 82.

While liquid is permitted to pass through the sheet 140, the size of the passageways 144 prevents the soil particles of the mixture 152 from moving into the hollow interior 142.

As a result, those soil particles accumulate on the upstream surface 146 of the sheet 140 and cover the passageways 144, thereby preventing liquid from passing into the hollow interior 142.

The rotation of the filter 130 about the axis 116 causes the unfiltered liquid or mixture 150 of liquid and soil particles within the filter chamber 82 to rotate about the axis 116 the same counter-clockwise direction. Centrifugal force urges the soil particles toward the side wall 76 as the mixture 150 rotates about the axis 116. As a portion of the liquid advances through the gap 188, its angular velocity increases relative to its previous velocity as well as relative to the portion of liquid that does not advance through the gap 188 and an increased shear force zone 190 (FIG. 5) is formed by the significant increase in angular velocity of the liquid in the relatively short distance between the first artificial boundary 180 and the rotating filter 130.

As the first artificial boundary 180 is stationary, the liquid in contact with the first artificial boundary 180 is also stationary or has no rotational speed. The liquid in contact with the upstream surface 146 has the same angular speed as the rotating filter 130, which is generally in the range of 3000 rpm, which may vary between 1000 to 5000 rpm. The speed of rotation is not limiting to the present disclosure. The liquid in the increased shear zone 190 has an angular speed profile of zero where it is constrained at the first artificial boundary 180 to approximately 3000 rpm at the upstream surface 146, which requires substantial angular acceleration, which locally generates the increased shear forces on the upstream surface 146. Thus, the proximity of the first artificial boundary 180 to the rotating filter 130 causes an increase in the angular velocity of the liquid passing through the gap 188 and results in a shear force being applied on the upstream surface 146.

This applied shear force aids in the removal of soils on the upstream surface 146 and is attributable to the interaction of the liquid and the rotating filter 130. The increased shear zone 190 functions to remove and/or prevent soils from being trapped on the upstream surface 146. The liquid passing between the first artificial boundary 180 and the rotating filter 130 applies a greater shear force on the upstream surface 146 than liquid in an absence of the first artificial boundary 180. Further, an increase in shear force may occur on the downstream surface 148 where the artificial boundary 160 overlies the downstream surface 148. The liquid would have an angular speed profile of zero at the artificial boundary 160 and would increase to approximately 3000 rpm at the downstream surface 148, which generates the increased shear forces.

Figure 6:
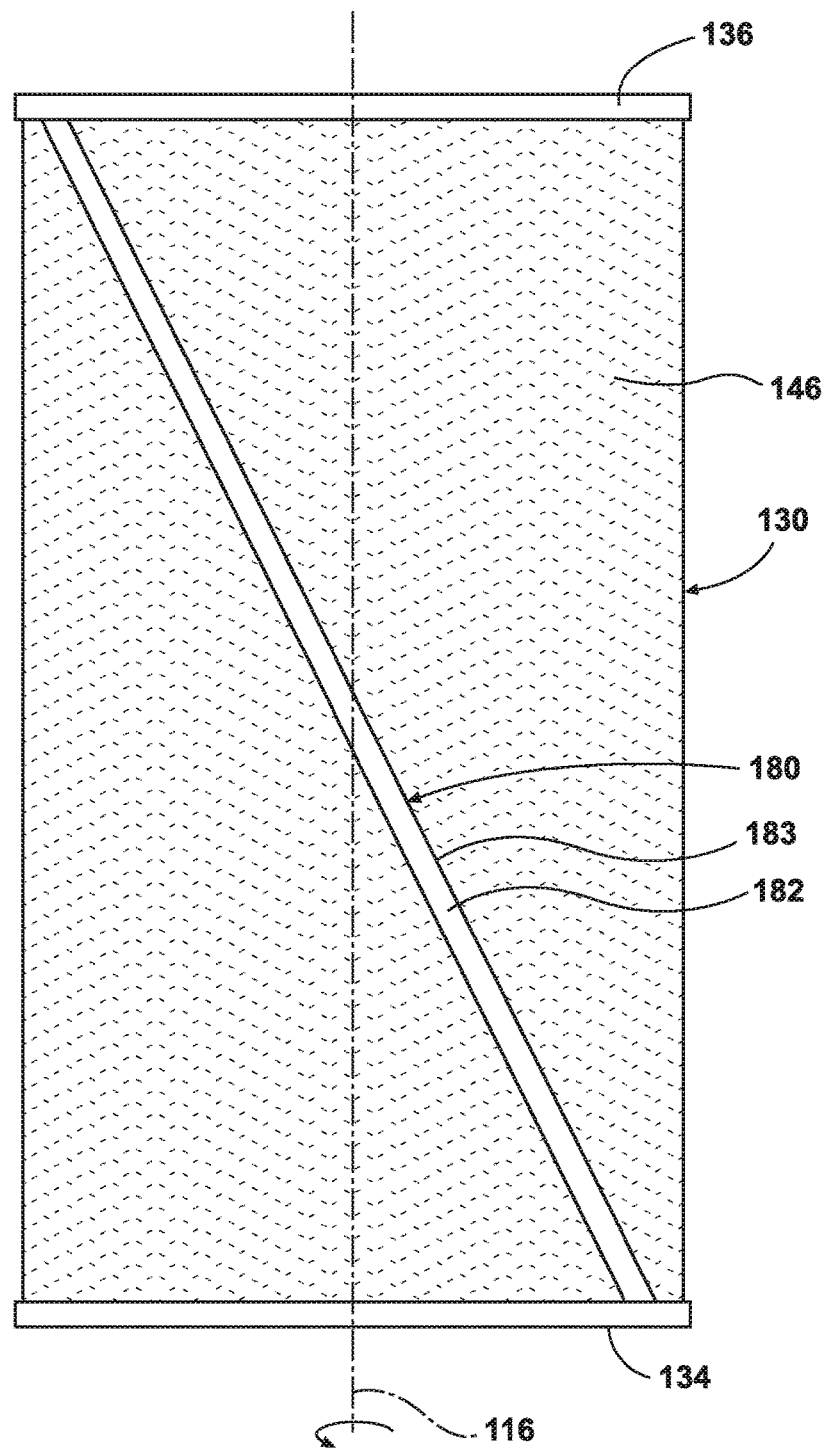
FIG. 6 is a schematic top view of a filter and artificial boundary illustrated in the pump and filter assembly of FIG. 4.

In addition to removing soils from the upstream surface 146, the configuration of the artificial boundary 180 and its surface 183, which is oriented at an angle relative to the axis 116, acts to deflect soils near the upstream surface 146 toward one of the first and second ends 134, 136. The end, which the soils may accumulate at, may depend on the rotational direction of the filter 130 and the angle of orientation of the artificial boundary 180. FIG. 6 illustrates a top view of the filter 130 and artificial boundary 180 and more clearly illustrates that the artificial boundary 180 has a surface 183, which is oriented at an angle relative to the axis 116 and is linear from the first end 134 to the second end 136. During operation, soils will naturally come in contact with the artificial boundary 180 as the liquid with soils in the filter chamber 82 rotate about the filter chamber 82. Further, soils that may have been removed from the filter 130 by the shear forces created by the artificial boundary 180 may also come in contact with the artificial boundary 180 after removal because centrifugal force will urge the soils away from the filter 130 towards the housing 62. Soils in contact with the surface 183 will be deflected along the surface 183 towards the second end 136 because a portion of the rotating water flow caused by the rotating water will contact the surface 183 and flow along the angled orientation of the surface 183. The soils will be drawn along the surface 183 towards the end 136 where the soils may then accumulate. Essentially, the configuration of the artificial boundary 180 encourages a movement of soils to the end 136. The drain outlet 72 is located near the end 136 such that soil, which has accumulated at the end 136, may be easily pumped out of the housing 62.

It should be noted that while the filter 130 has been described as rotating in the counter-clockwise direction and the artificial boundary 180 has been described as herding soils to the end 136 it may be understood that the assembly may be configured to have the filter rotate in a clockwise direction with the impeller or have the artificial boundary 180 oriented to direct the soils to the first end 134. Regardless of which end the soils are herded towards, the drain outlet 72 may be located near the end the soils accumulate at for ease of removal of the soils from the filter chamber 82.

Figure 7:
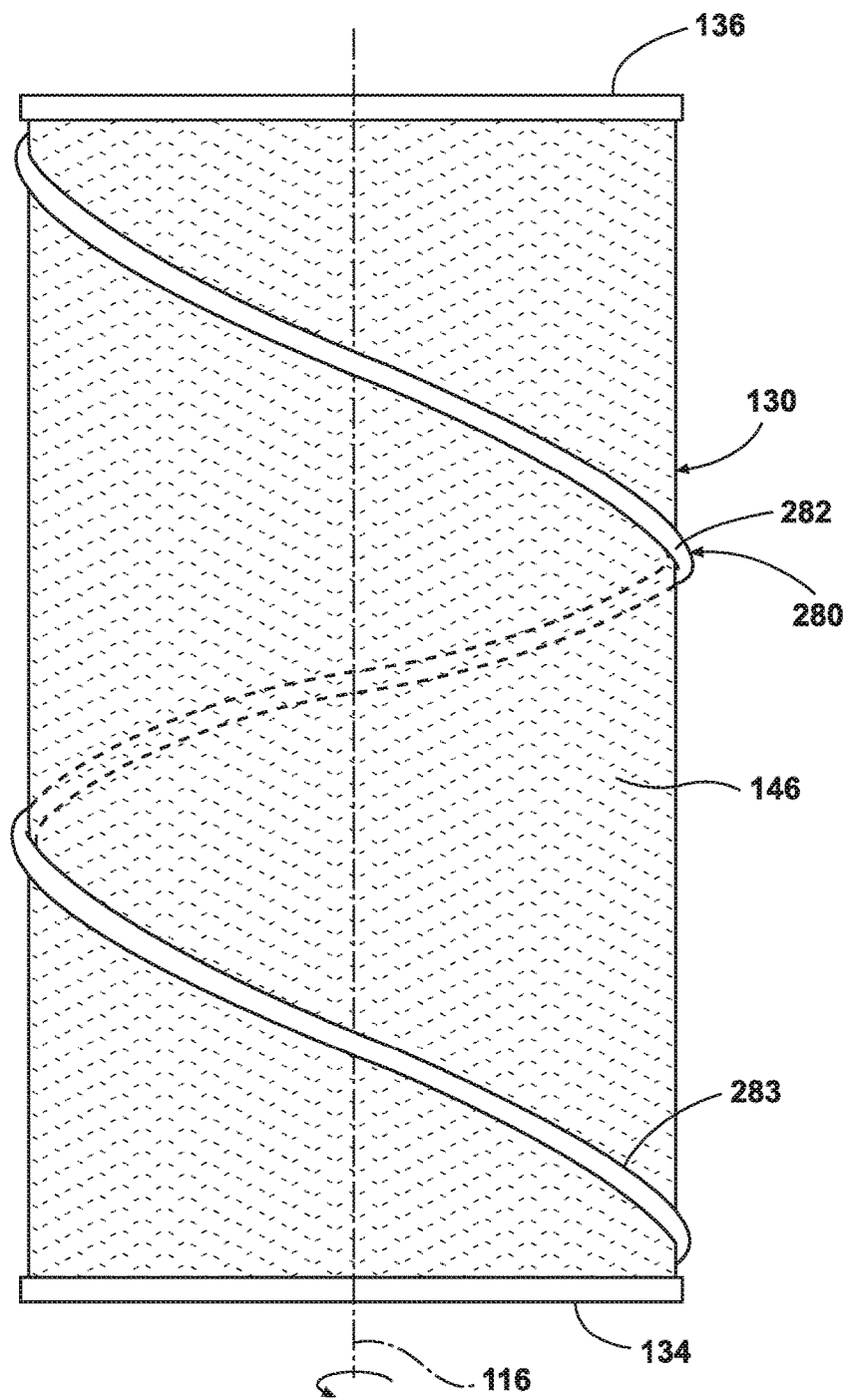
FIG. 7 is a schematic top view of a filter and artificial boundary, which may be used in the pump and filter assembly of FIG. 3 according to a second embodiment.

FIG. 7 illustrates a top view of an alternative artificial boundary 280 according to a second embodiment. The alternative artificial boundary 280 also has a surface 283, which is oriented at an angle relative to the axis 116 and may act to deflect soils near the upstream surface 146 toward one of the first and second ends 134, 136 where the soils may then accumulate at that end. The difference between the first embodiment and the second embodiment is that the surface of the artificial boundary 280 is helical instead of linear. It is contemplated that the artificial boundaries may have other alternative shapes so long as the surface is oriented at an angle relative to the central axis 116 such that soils near the upstream surface are deflected toward one of the first and second ends 134, 136. Further, the internal artificial boundaries may have complementary shapes or cross-sections, which may act to enhance the shear force benefit. The second embodiment operates much the same way as the first embodiment. That is, the rotation of the filter 130 about the axis 116 causes the liquid and soil particles to rotate about the axis 116. Centrifugal forces push the liquid and soils towards the outside and soils, which come in contact with the surface 283, are deflected by force vectors towards the end 136.

Figure 8:
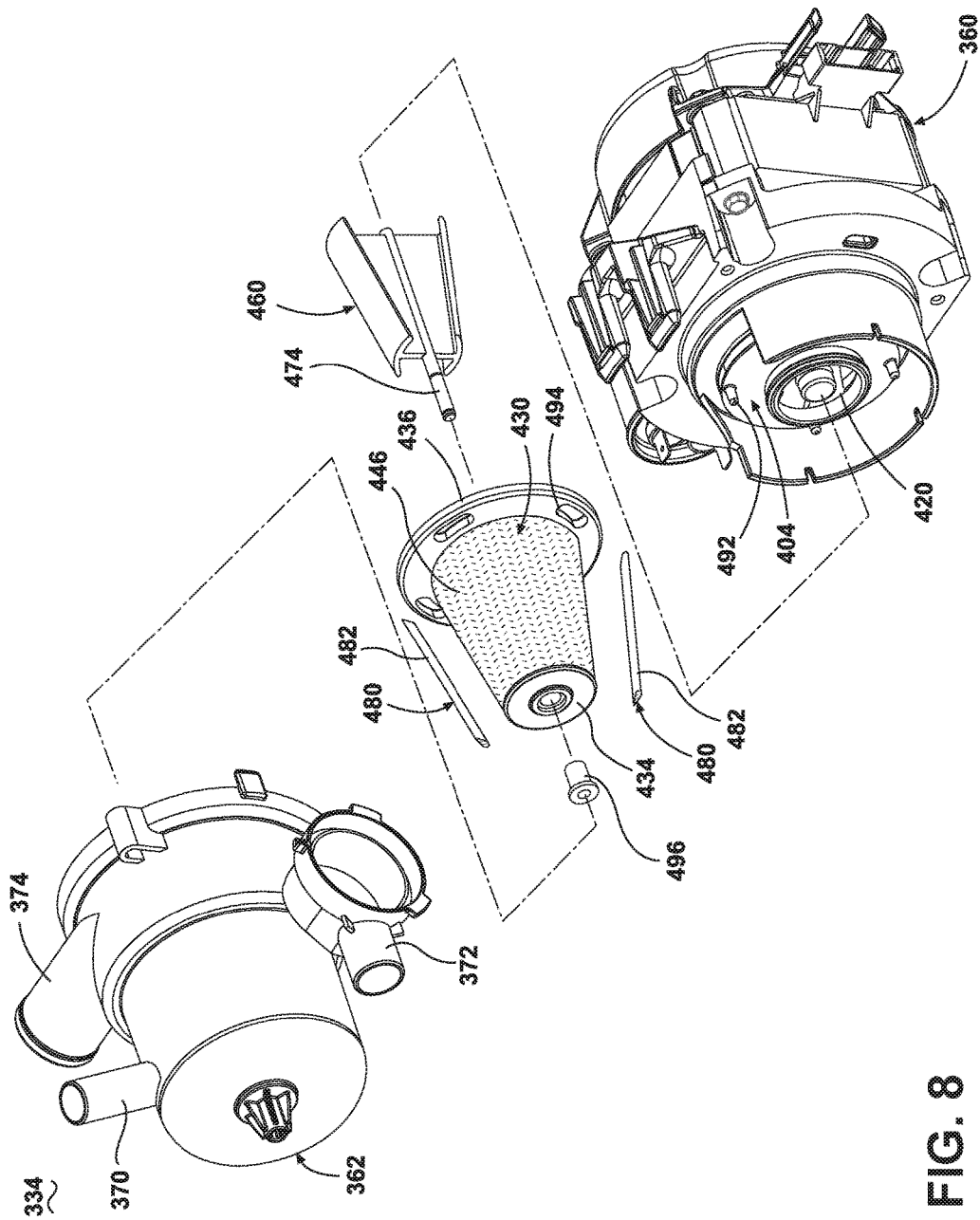
FIG. 8 is an exploded view of a third embodiment of a pump and filter assembly, which may be used in the dishwashing machine of FIG. 1.
Figure 9:
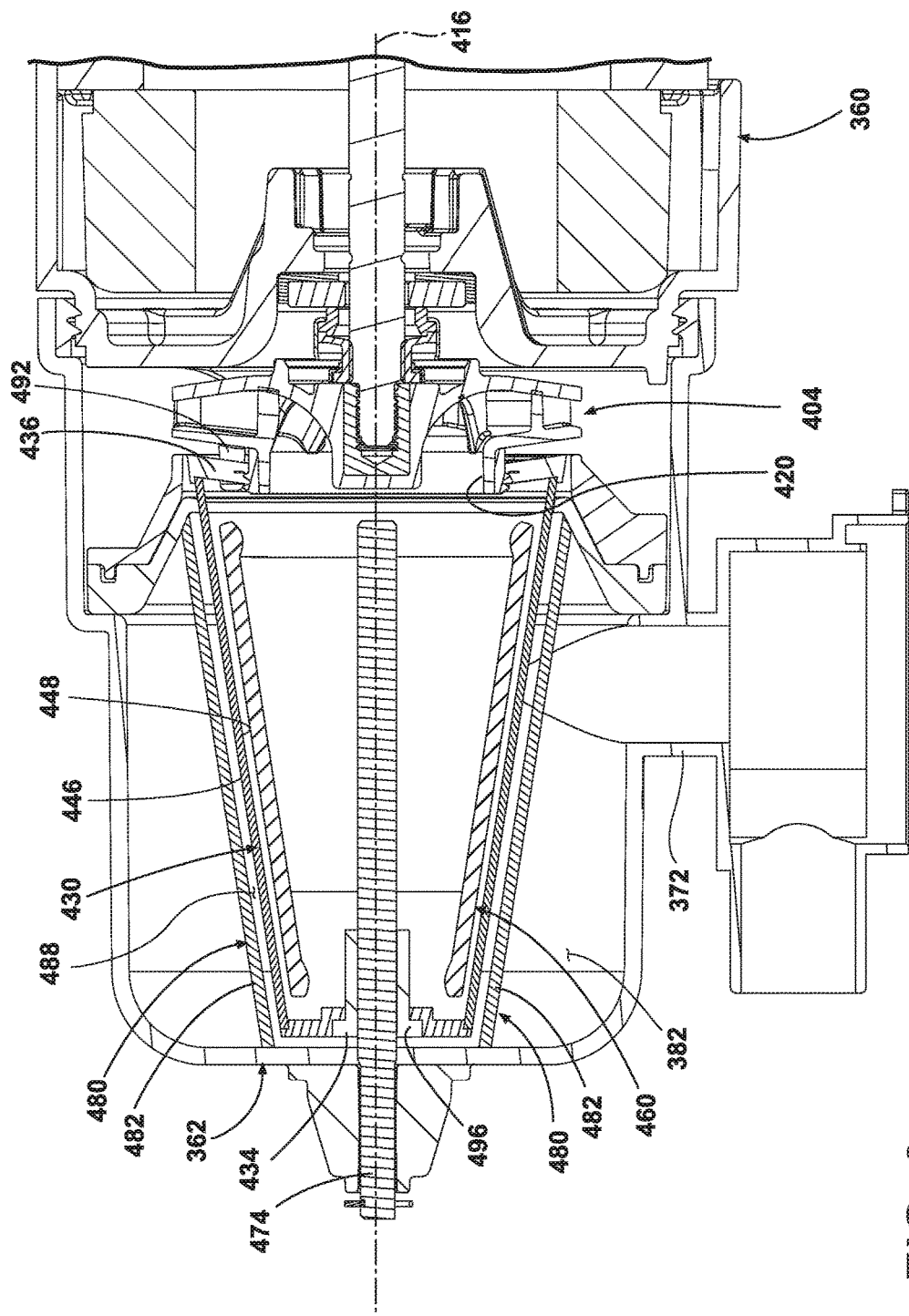
FIG. 9 is a cross-sectional view of the assembled pump and filter assembly of FIG. 8.

FIGS. 8 and 9 illustrate an alternative pump and filter assembly according to a third embodiment. The third embodiment is similar in some aspects to the first embodiment; therefore, like parts will be identified with like numerals increased by 300, with it being understood that the description of the like parts of the first embodiment applies to the third embodiment, unless otherwise noted.

The pump and filter assembly 334 includes a modified filter casing or filter housing 362, a wash or recirculation pump 360, a rotating filter 430, internal artificial boundaries 460, and external artificial boundaries 480. The filter housing 362 defines a filter chamber 382 that extends the length of the filter casing 362 and includes an inlet port 370, a drain outlet port 372, and a recirculation outlet port 374. It is contemplated that the drain outlet port 372 may be formed directly in the housing 362 and may be fluidly coupled to a drain pump (not shown) to drain liquid and soils from the dishwasher 10. The recirculation pump 360 also includes an impeller 304, which has several pins 492 that may be received within openings 494 in the end 436 of the filter 430 such that the filter 430 may be operably coupled to the impeller 304 such that rotation of the impeller 304 effects the rotation of the filter 430.

The rotating filter 430 is similar to that of the first embodiment except that it has a first end 434 axially spaced from a second end 436 that is larger in diameter than the first end 434. This forms a cone-shaped filter 430 that has a central axis corresponding to the rotational axis 316. A cone shaped filter sheet may extend between the two ends 434 and 436 and may have an upstream surface 446 correlating to the outer surface and a downstream surface 448 correlating to the inner surface as described with respect to the above embodiment. A bearing 496 may be used to rotatably mount the first end 434 of the filter 430 to the housing 362 such that the filter 430 is free to rotate in the bearing 496 about the axis 316 in response to rotation of the impeller 304.

The internal artificial boundary 460 may be located internally of the filter 430 and may be positioned adjacent to the downstream surface 448 and may be secured by a shaft 474 to the housing 362. Suitable artificial flow boundaries are set forth in detail in U.S. patent application Ser. No. 12/966,420, filed Dec. 13, 2010, now U.S. Pat. No. 8,667,974, and titled "Rotating Filter for a Dishwashing Machine," which is incorporated herein by reference in its entirety. The bearing 496 may rotatably receive the stationary shaft 474, which in turn is mounted to the artificial boundary 460. Thus, the artificial boundary 460 may be stationary while the filter 430 is free to rotate. Further, an increase in shear force may occur on the downstream surface 448 where the artificial boundary 460 overlies the downstream surface 448. The liquid would have an angular speed profile of zero at the artificial boundary 460 and would increase to approximately 3000 rpm at the downstream surface 448, which generates the increased shear forces.

The artificial boundaries 480 may be located such that they are overlying and spaced from at least a portion of the upstream surface 446 to form an increased shear force zone as described with respect to the first embodiment. The artificial boundaries 480 apply a greater shear force on the upstream surface 446 than liquid in an absence of the first artificial boundary. The artificial boundaries 480 may be mounted to the housing 362. The artificial boundary 480 may be positioned in a partially or completely radial overlapping relationship with the artificial boundary 460 and spaced apart from the artificial boundary 480. In some cases, the shear zone benefit may be created with the artificial boundaries being in proximity to each other and not radially overlapping to any extent.

It is contemplated that the artificial boundaries 460 and 480 may be fixed relative to the filter 430, as illustrated, or that they may move relative to the filter 430. Suitable mechanisms for moving the artificial boundary 460 and/or the artificial boundary 480 are set forth in detail in U.S. patent application Ser. No. 13/108,026, filed May 16, 2011, now U.S. Pat. No. 9,107,559, and titled "Dishwasher with Filter Assembly," which is incorporated herein by reference in its entirety.

The third embodiment operates much the same as the above-described first embodiment in that when the impeller 304 is rotated the filter 430 is also rotated. The rotation of the impeller 304 draws liquid from the filter chamber 382 into the inlet opening of the impeller 304. The liquid is then forced out through the recirculation outlet port 374 to the spray system. The recirculation pump 360 is fluidly coupled downstream of the downstream surface 448 of the filter 430 at the second end 436 and if the recirculation pump 360 is shut off then any liquid not expelled will settle in the filter chamber 382 and may be drained by the drain pump through the drain outlet port 372.

Figure 10:
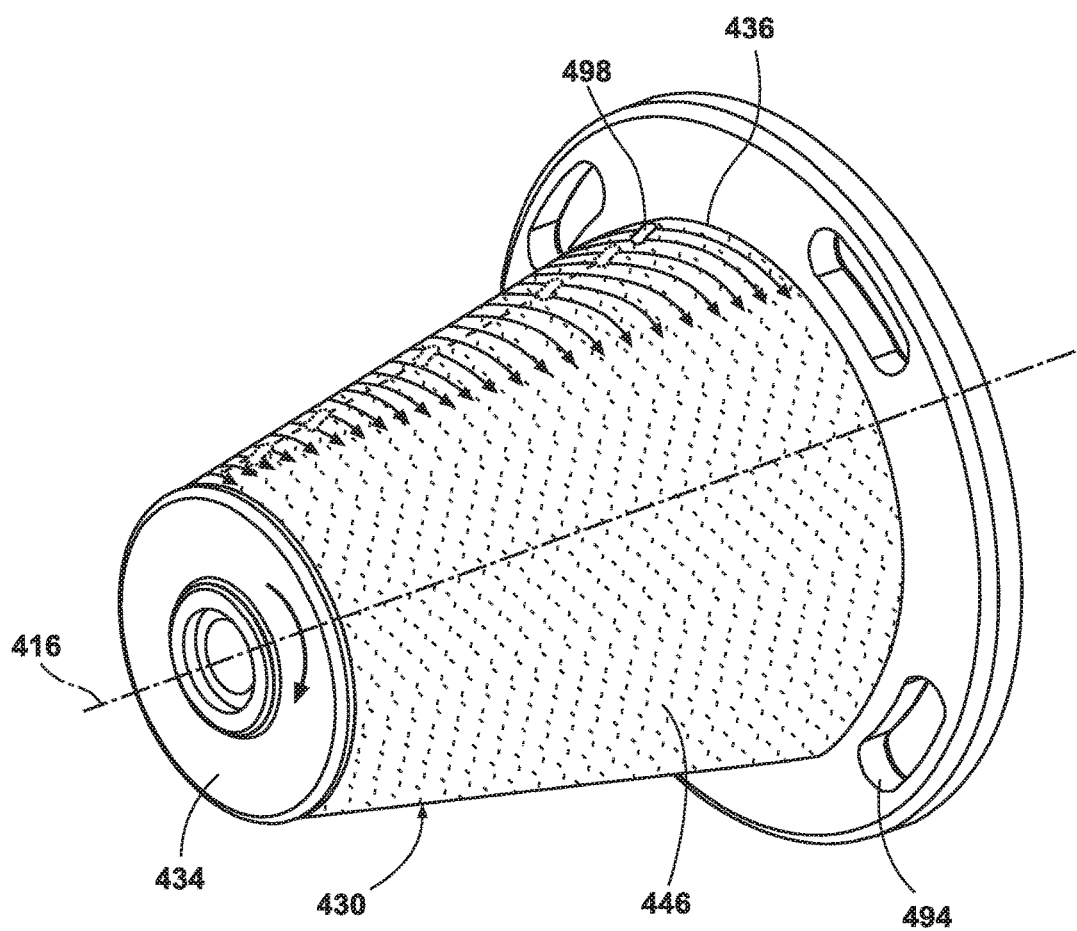
FIG. 10 is a schematic perspective view of a filter and artificial boundary illustrated in FIG. 8.

One main difference in the operation is that the rotation of the cone filter 430 generates a soil flow from the first end 434 to the second end 436. That is, soil 498, which is filtered from the liquid and residing on the upstream surface 446, is urged by the soil flow toward the second end 436, even without the use of the first artificial boundary 480, because of a flow path that develops from the first end 434 to the second end 436. It will be understood that the filter 430 as a whole is rotated by the impeller 304 at a single rotational speed. Thus, all points on the filter 430 have the same rotational speed. However, because the diameter of the cone filter continuously increases from the first end 434 to the larger diameter second end 436, the tangential velocity (illustrated by the arrows on FIG. 10) increases axially from the first end 434 to the second end 436 for any point on the upstream surface 446. The increase in the tangential velocity necessarily requires a corresponding increase in the tangential acceleration.

As such, the tangential acceleration increases from the first end 434 to the second end 436, which creates a soil flow from the first end 434 to the second end 436 when the acceleration rate is great enough to overcome other forces, such as gravity acting on the suspended soils, which would tend to draw the soils down toward the small end 434 for a horizontally oriented filter as illustrated. For the contemplated rotational speed range (1000 rpm to 5000 rpm) for the illustrated cone filter 430, the resulting tangential acceleration is great enough to form the soil flow from the first end 434 to the second end 436. Therefore, rotation of the cone filter 430 alone is sufficient to move the soils toward one end, the large end 436, of the filter 430, when the filter 430 is rotated at a high enough speed.

Figure 11:
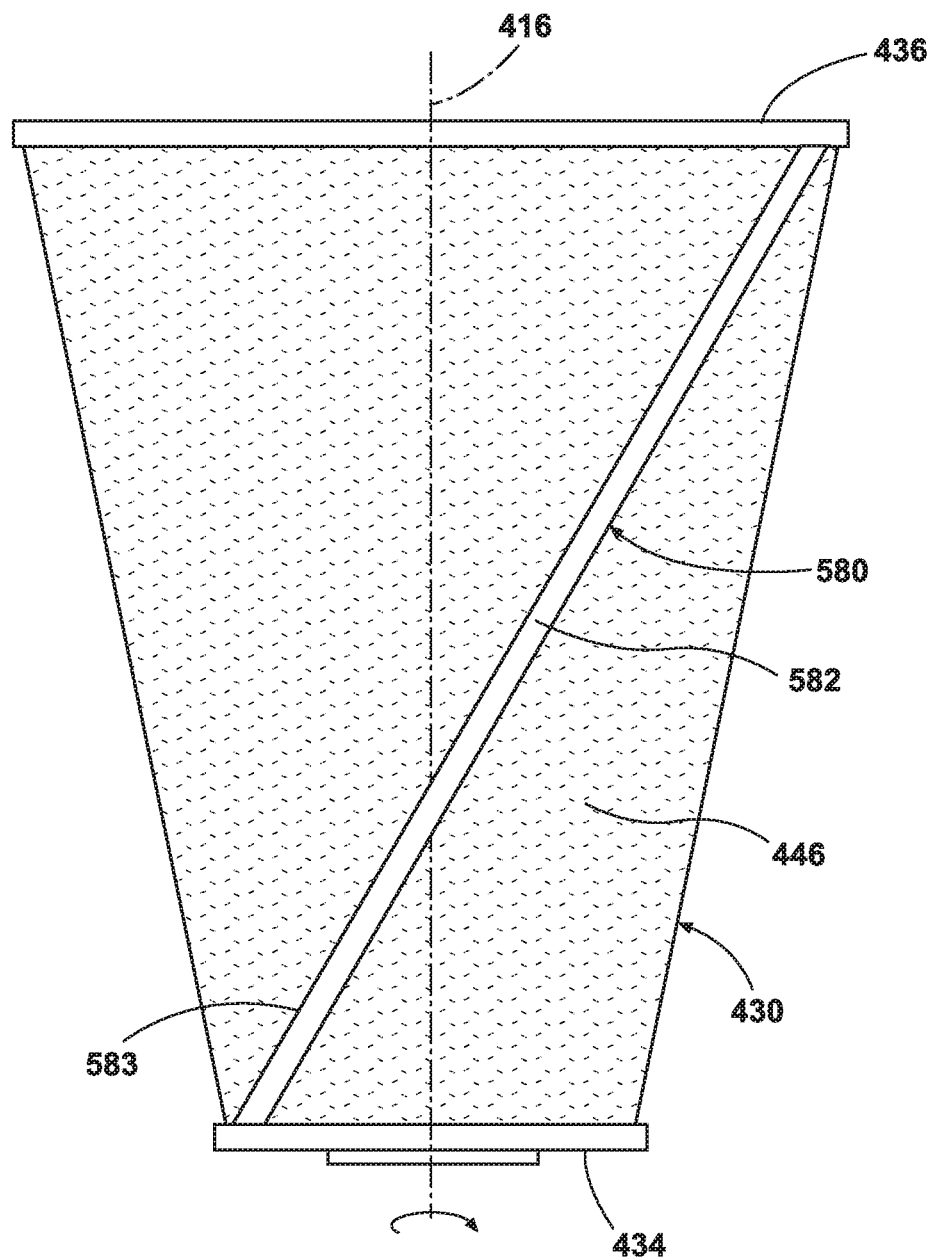
FIG. 11 is a schematic top view of a filter and artificial boundary, which may be used in the pump and filter assembly of FIG. 8 according to a fourth embodiment.

FIG. 11 illustrates a top view of an alternative artificial boundary 580 according to a fourth embodiment, which may be used with the cone-filter 430 described above. The artificial boundary 580, much like the first embodiment, has a linear surface 583, which is oriented at an angle relative to the axis 416 and may act to deflect soils near the upstream surface 446 toward the second end 436 where the soils may then accumulate at that end. The difference between the third embodiment and the fourth embodiment is that the orientation of the surface 583 of the artificial boundary 580 acts to deflect the soils towards the end 436 along with the soil flow already created by the cone shape filter 430 itself, which also directs the soils towards the second end 436. Thus, the shape of the rotating filter 430 and the surface 583 being oriented at an angle relative to the central axis 416 both act together to deflect soils towards the second end 436.

Figure 12:
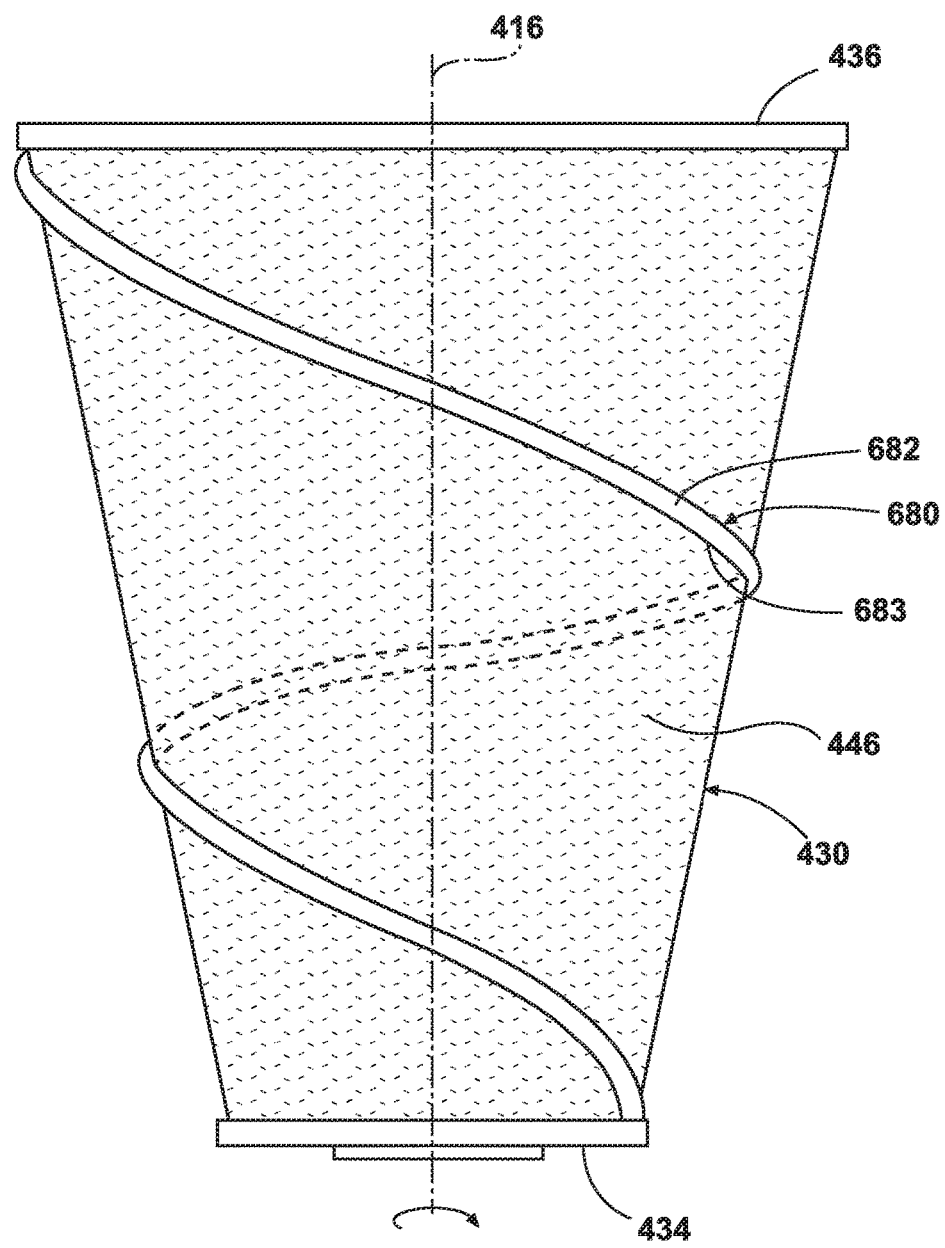
FIG. 12 is a schematic top view of a filter and artificial boundary, which may be used in the pump and filter assembly of FIG. 8 according to a fifth embodiment.

FIG. 12 illustrates a top view of an alternative artificial boundary 680 according to a fifth embodiment. Much like the fourth embodiment, the artificial boundary 680 has a surface 683, which is oriented at an angle relative to the axis 416 and may act to deflect soils near the upstream surface 446 toward the second end 436 where the soils may then accumulate at that end. The difference between the fourth embodiment and the fifth embodiment is that the surface 683 of the artificial boundary 680 is helical instead of linear. It too acts together with the soil flow created by the cone shaped filter 430 to deflect soils towards the second end 436.

It is contemplated that the artificial boundary or artificial boundaries may have other alternative shapes so long as the surface is oriented at an angle relative to the central axis of the filter such that soils near the upstream surface are deflected toward one of the first and second ends. It likely is understood, but aspects of the various embodiments may be combined in any desired manner to accomplish a desired utility. By way of non-limiting example, various aspects of the first embodiment may be combined with the later embodiments as desired to accomplish the inclusion of internal artificial boundaries and to effect rotation of either or both of the artificial boundaries relative to the filter.

In the home appliance industry, sound is an important consideration as a user's satisfaction with the appliance may be hindered with increased appliance noise. While the filter and flow diverters allow for excellent filtration of soils from recirculated liquid the use of the artificial boundaries, under certain conditions and/or configurations, they may increase the sound produced by the dishwasher. The remaining embodiments describe a variety of ways to reduce the amount of sound created by a dishwasher having a filter and artificial boundaries.

Figure 13:
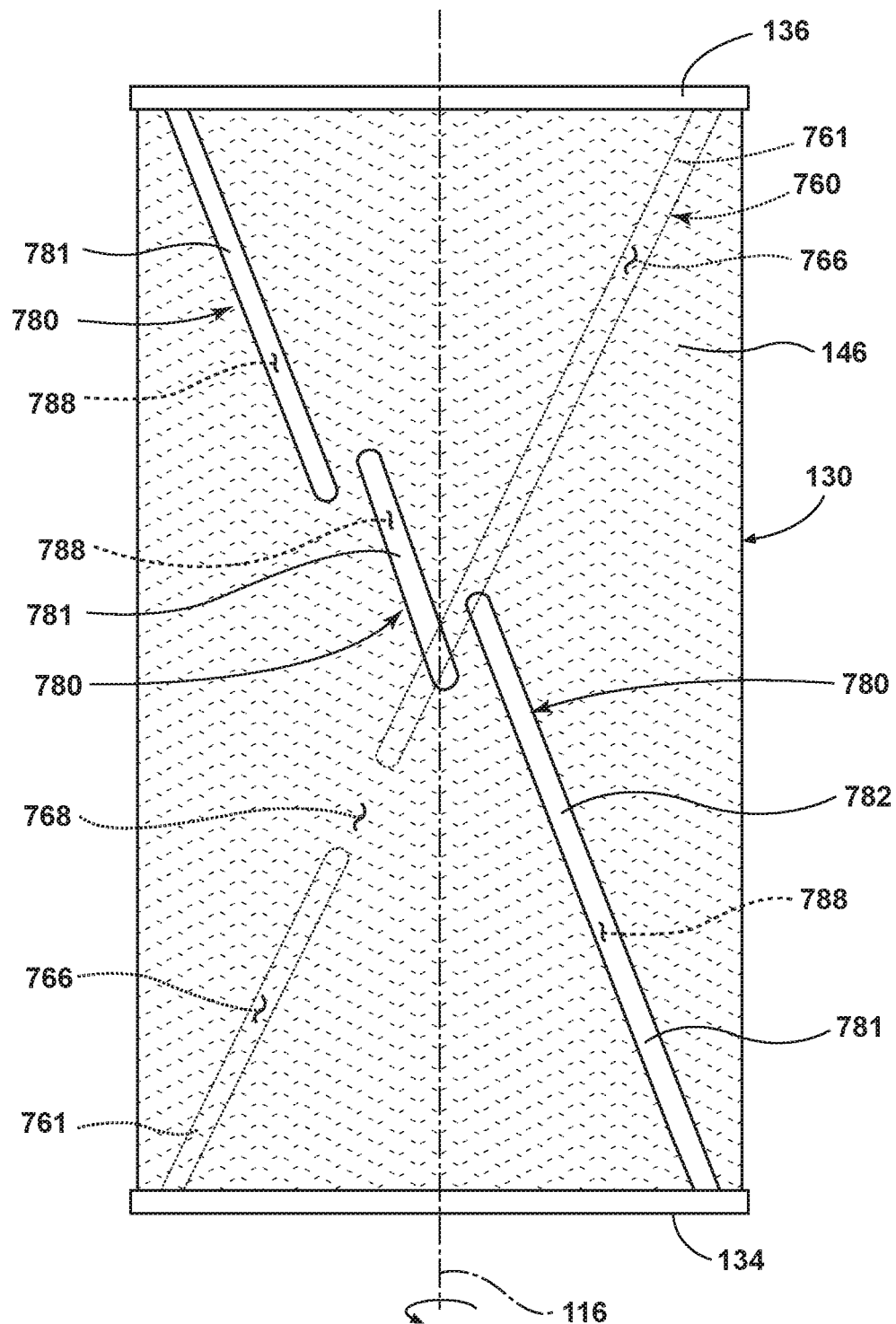
FIG. 13 is a schematic top view of a filter and artificial boundary, which may be used in the pump and filter assembly of FIG. 3 according to a sixth embodiment.

FIG. 13 illustrates alternative artificial boundaries 760 and 780 according to a sixth embodiment. The alternative artificial boundaries 760 and 780 are illustrated in the context of the pump and filter assembly illustrated in FIG. 3 of the first embodiment and the numbers of those parts have not been changed. The alternative artificial boundaries 760 and 780 are similar in some aspects to the artificial boundaries of the first embodiment; therefore, like parts will be identified with like numerals increased by 600, with it being understood that the description of the like parts of the first embodiment applies to the seventh embodiment, unless otherwise noted.

As with the first embodiment the artificial boundary 760 is shaped such that it is not aligned or parallel with the axis of rotation 116 of the filter 130. A first difference is that the artificial boundary 760 is also illustrated as having multiple segmented portions 761 forming its body 782. In this manner, the artificial boundary 760 does not extend continuously along a length of the filter 130. Further, the artificial boundary 760 is oriented at an angle relative to the axis 116, as described above. The multiple segmented portions 761 of the artificial boundary 760 are positioned in the hollow interior 142 of the filter 130 and are spaced from the filter 130 to form gaps 766 there between. In the illustrated example, the multiple segmented portions 761 of the artificial boundary 760 are spaced such that there is a space 768 between the multiple segmented portions 761 of the artificial boundary 760.

Another difference is that the artificial boundary 780 also has a body 782 having multiple segmented portions 781, which are also oriented at an angle relative to the axis 116 such that they extend along the rotating filter such that they are not aligned with the rotational axis 116 of the filter 130. This aids in decreasing the sound created during operation. In this manner, the artificial boundary 780 is also shaped such that it does not extend continuously along a length of the filter body and is not parallel with the rotational axis 116. Each of the multiple segmented portions 781 is spaced from at least a portion of the filter 130 to form gaps 788 there between, which creates increased shear force zones as described above. The artificial boundary 780 and the artificial boundary 760 may be oriented with respect to each other in any suitable manner including that the artificial boundary 780 may be positioned in a partially or completely overlapping relationship with the artificial boundary 760. In some cases, the shear zone benefit may be created with the artificial boundaries being in proximity to each other and not overlapping to any extent. The artificial boundaries 760 and 780 may have complementary shapes or cross-sections, which act to enhance the shear force benefit. Further, while each of the multiple segmented portions 781 has been illustrated as overlapping another along a length of the filter 130 this need not be the case. Instead, only a few of the multiple segmented portions 781 may overlap or the multiple segmented portions 781 may be spaced from each other.

The operation of the sixth embodiment is similar to that of the first embodiment. Including that, soils will naturally come in contact with the artificial boundary 780 as the liquid with soils in the filter chamber 82 rotate about the filter chamber 82. Further, soils that may have been removed from the filter 130 by the shear forces created by the artificial boundary 780 may also come in contact with the artificial boundary 780 after removal because centrifugal force will urge the soils away from the filter 130 towards the housing 62. Soils may be deflected towards the second end 136 because a portion of the rotating water flow caused by the rotating water will contact the artificial boundary 780 and flow along the angled orientation of the artificial boundary 780. Further, during operation the artificial boundary 760 and the artificial boundary 780 result in less noise as the frequency and overall decibels are reduced as compared to a diverter that runs along an axial length of the filter.

Figure 14:
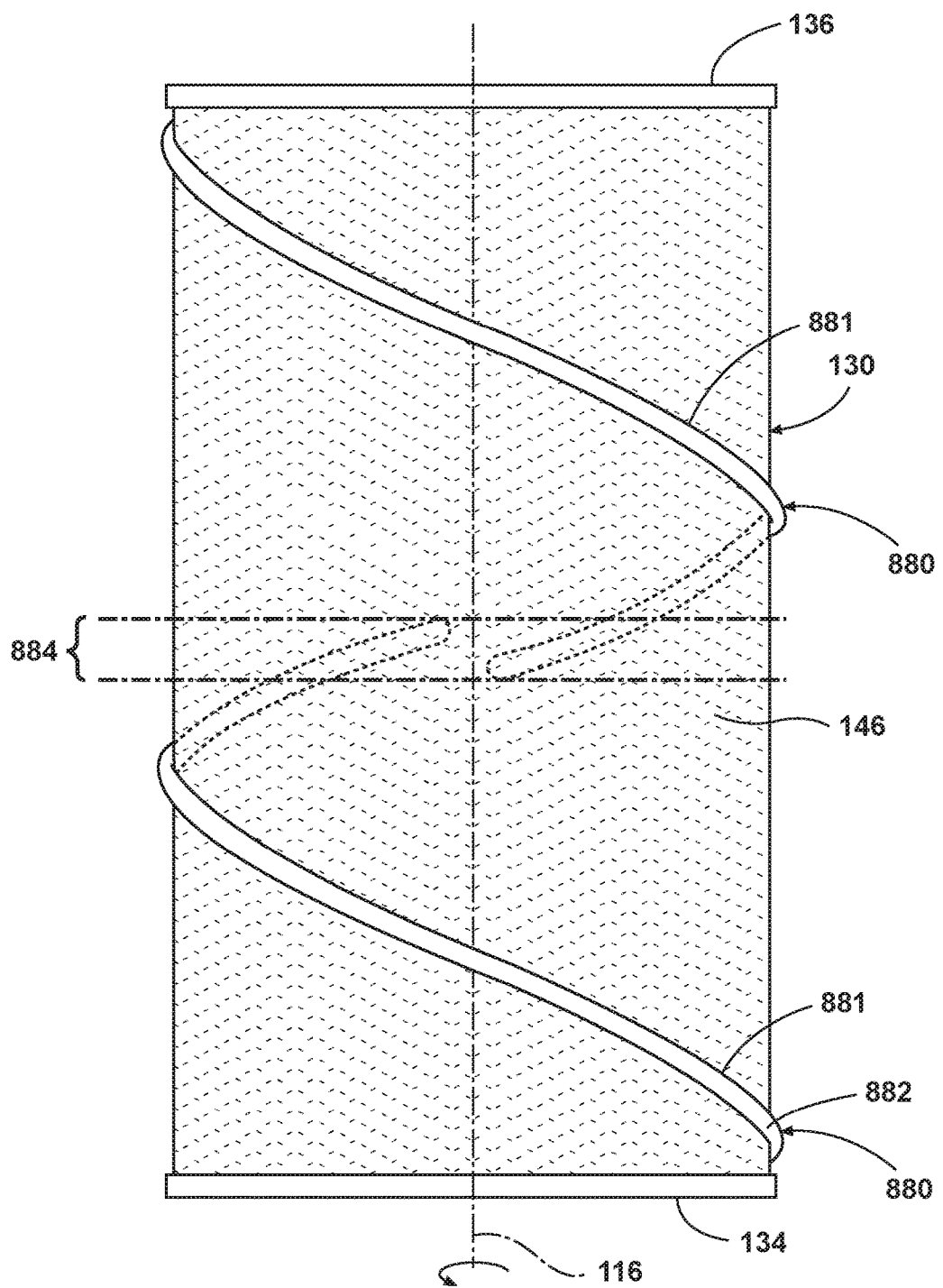
FIG. 14 is a schematic top view of a filter and artificial boundary, which may be used in the pump and filter assembly of FIG. 3 according to a seventh embodiment.

FIG. 14 illustrates an alternative artificial boundary according to a seventh embodiment. The seventh embodiment is similar in some aspects to the sixth embodiment; therefore, like parts will be identified with like numerals increased by 100, with it being understood that the description of the like parts of the sixth embodiment applies to the seventh embodiment, unless otherwise noted.

One difference is that the artificial boundary 880 has been illustrated as helical instead of linear. The helical nature of the artificial boundary 880 is such that it is not aligned with the rotational axis 116 of the filter 130. It is contemplated that the artificial boundaries, either interior or exterior of the filter 130 may have other alternative shapes so long as the artificial boundary is not aligned with the rotational axis of the filter. Further, while only a first artificial boundary 880 is illustrated, a second artificial boundary could be included and be spaced from the other surface of the filter 130. Further, any second artificial boundaries spaced from the other of the surfaces of the filter 130 may have complementary shapes or cross-sections, which may act to enhance the shear force benefit. Further, any second artificial boundaries spaced from the other of the surfaces may also not be aligned with the rotational axis 116 of the filter 130 to aid in decreasing the sound created during operation. Further still, the artificial boundary 880 has been illustrated as having two multiple segmented portions 881, which overlap along a portion 884 of the filter 130. In this manner, the artificial boundary 880 does not extend continuously along the filter 130. The seventh embodiment operates much the same way as the sixth embodiment.

Figure 15:
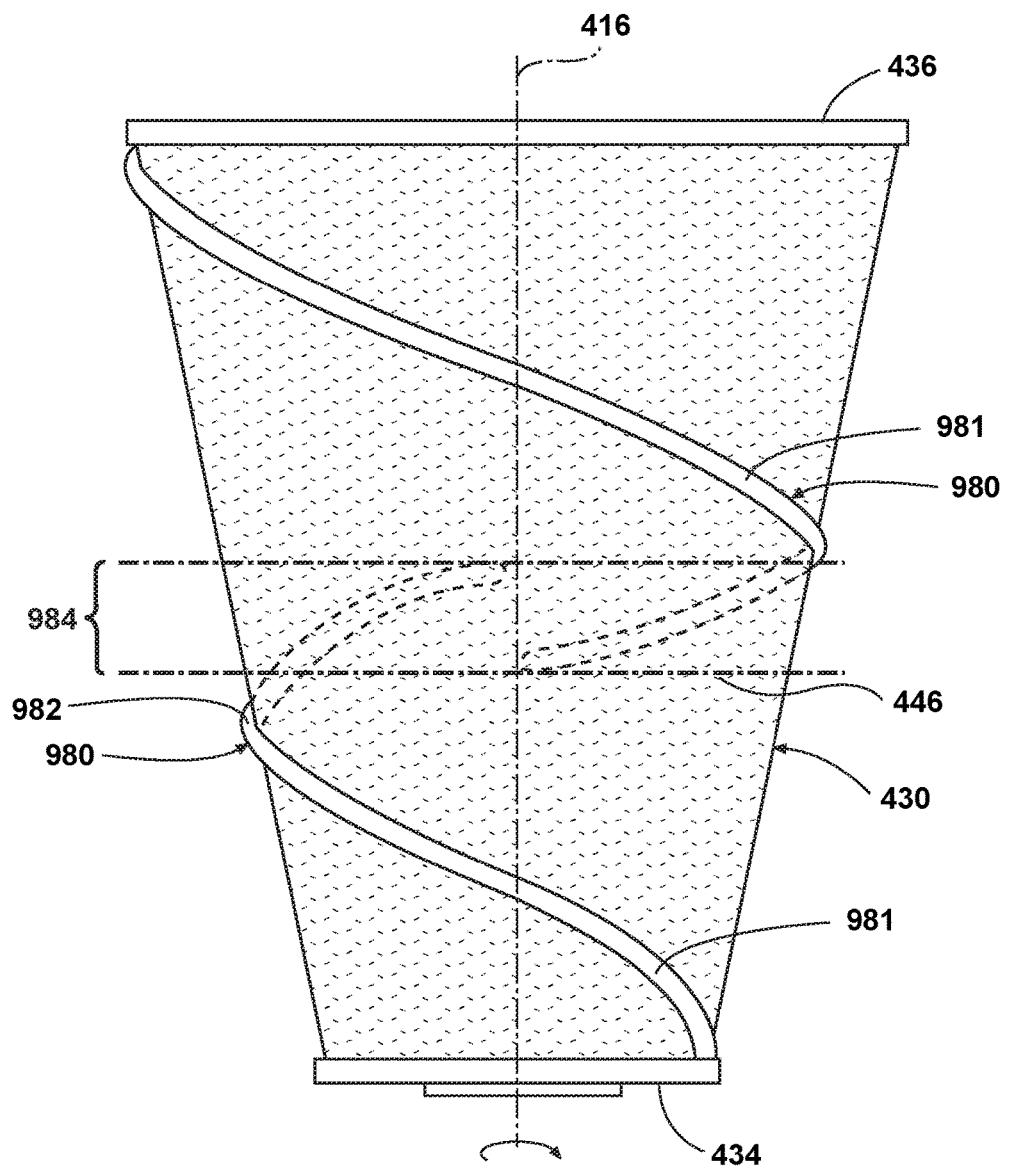
FIG. 15 is a schematic top view of a filter and artificial boundary, which may be used in the pump and filter assembly of FIG. 8 according to an eighth embodiment.

FIG. 15 illustrates an alternative artificial boundary according to an eighth embodiment. The alternative artificial boundary 980 is illustrated in the context of the pump and filter assembly of the third embodiment and the numbers of those parts have not been changed. The alternative artificial boundary 980 is similar in some aspects to the artificial boundary 880 of the seventh embodiment; therefore, like parts will be identified with like numerals increased by 100, with it being understood that the description of the like parts of the third and seventh embodiments applies to the eighth embodiment, unless otherwise noted.

The difference being that the artificial boundary 980 is shaped such that it follows the contours of the cone-shaped filter 430. As with the previous embodiment, the artificial boundary 980 is helical and is not aligned with the rotational axis 416 of the filter 430. The artificial boundary 980 also does not extend continuously along a length of the filter 430 to aid in decreasing the sound created during operation. Further, the artificial boundary 980 has been illustrated as having two multiple segmented portions 981, which overlap along a portion 984 of the filter 430.

It will be understood for the above embodiments having multiple segmented portions forming the artificial boundaries that the multiple segmented portions may be much smaller and/or that the spaces or overlapping portions between the multiple segmented portions along the length of the filter may be much smaller or much larger and need not be the same. Further still, multiple interior and exterior artificial boundaries may be utilized. Thus, it will be understood that the drawings are merely exemplary.

Figure 16:
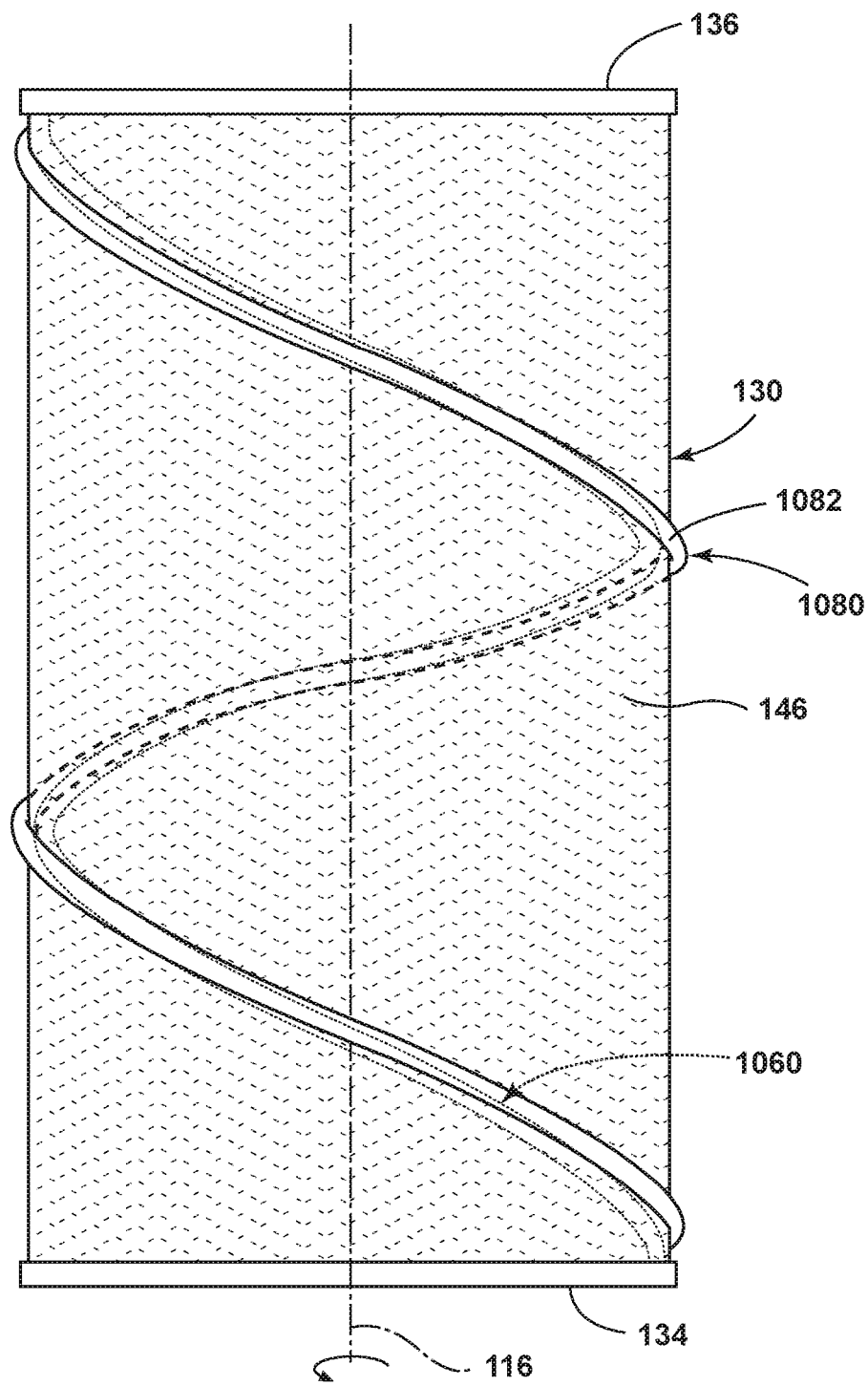
FIG. 16 is a schematic top view of a filter and artificial boundary, which may be used in the pump and filter assembly of FIG. 3 according to a ninth embodiment.

FIG. 16 illustrates alternative artificial boundaries 1060 and 1080 according to a ninth embodiment. The alternative artificial boundaries 1060 and 1080 are illustrated in the context of the pump and filter assembly illustrated in FIG. 3 of the first embodiment and the numbers of those parts have not been changed. The alternative artificial boundaries 1060 and 1080 are similar in some aspects to the artificial boundaries of the second embodiment; therefore, like parts will be identified with like numerals increased by 800, with it being understood that the description of the like parts of the first and second embodiments applies to the ninth embodiment, unless otherwise noted. One difference is that the internal artificial boundary 1060 has been illustrated as a complementary helical shape to that of the artificial boundary 1080. In this manner, both artificial boundaries have been shaped such that while they are continuous they do not align with the rotational axis 116 of the filter 130, which aids in decreasing the sound created during operation.

While the helical artificial boundaries 1060 and 1080 have been illustrated as being utilized with the cylindrical filter 130 it will be understood that they may be utilized with any suitably shaped filter including a cone-shaped filter wherein the helical artificial boundaries may be contoured to the cone shape. Further still, the use of only a single artificial boundary may reduce the noise created as a smaller number of shear force zones would be created.

While the embodiments have been illustrated in the above manner, it will be understood that the advantages of sound reduction achieved when an artificial boundary is not aligned with the rotational axis of the filter may be realized in a variety of different configurations. Thus, it will be understood that the present disclosure may include any suitable rotating filter having opposing first and second surfaces with the rotating filter being positioned within the recirculation flow path to filter soils from liquid flowing through the fluid flow path as the liquid passes through the rotating filter between the first and second surfaces. For example, the rotating filter may be a hollow rotating filter shaped like a cylinder, cone, etc. or the rotating filter may be a rotating disk, other non-hollow shape, etc. Further still, any number and type of flow diverters may be used including that the flow diverters may have various shapes as described in detail in the U.S. patent application Ser. No. 14/268,282, filed May 2, 2014, now U.S. Pat. No. 9,375,129, and entitled Rotating Filter for a Dishwashing Machine, which is incorporated by reference herein in its entirety.

There are a plurality of advantages of the present disclosure arising from the various features of the method, apparatuses, and system described herein. For example, the embodiments of the apparatus described above allows for enhanced filtration such that soil is filtered from the liquid and not re-deposited on utensils. Further, the embodiments of the apparatus described above allow for cleaning of the filter throughout the life of the dishwasher and this maximizes the performance of the dishwasher. Thus, such embodiments require less user maintenance than required by typical dishwashers. Further still, a reduction in sound may be realized by the present disclosure, which results in increased user satisfaction.

To the extent not already described, the different features and structures of the various embodiments may be used in combination with each other as desired. That one feature may not be illustrated in all of the embodiments is not meant to be construed that it may not be, but is done for brevity of description. Thus, the various features of the different embodiments may be mixed and matched as desired to form new embodiments, whether or not the new embodiments are expressly described. All combinations or permutations of features described herein are covered by this disclosure.

Further still, in the above-described embodiments it is contemplated that the filter may be stationary and that the flow diverters may rotate as set forth in detail in U.S. patent application Ser. No. 13/108,026, filed May 16, 2011, now U.S. Pat. No. 9,107,559, and titled "Dishwasher with Filter Assembly," which is incorporated herein by reference in its entirety. In such an instance the filter is located within the recirculation flow path such that the sprayed liquid passes through the filter to effect a filtering of the sprayed liquid and at least one flow diverter that is not aligned with the central axis of the filter moves over at least a portion of the outer and/or inner surfaces of the filter to form an increased shear force zone there between.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention, which is defined in the appended claims.

What is claimed is:

1. A dishwasher, comprising
    a tub at least partially defining a treating chamber;
    a liquid spraying system configured to supply at least one spray of liquid into the treating chamber;
    a liquid recirculation system fluidly coupling the treating chamber to the liquid spraying system and defining a recirculation flow path; and
    a liquid filtering system, comprising:
        a housing defining an enclosed filter chamber and configured to be fluidly coupled to the recirculation flow path;
        a filter located within the housing and having a first end axially spaced from a second end, where the second end is larger in diameter than the first end, and defines a cone-shaped filter that encloses a hollow interior, the filter having a first surface and a second surface, the filter being positioned within the recirculation flow path to filter soils from liquid flowing through the recirculation flow path as the liquid passes through the filter from the first surface to the second surface and where the filter fluidly divides the enclosed filter chamber into a first part that contains filtered soil particles and a second part that excludes filtered soil particles; and
        a flow diverter spaced apart from one of the first surface or the second surface to define a gap through which at least some of the liquid passes as the liquid flows through the recirculation flow path;

wherein during recirculation the enclosed filter chamber is configured to be filled with liquid and at least one of the filter or the flow diverter are configured to rotate within the housing and rotation of the at least one of the filter or the flow diverter is configured to create a rotational flow of liquid within the enclosed filter chamber about the first surface or the second surface to create an increase in angular velocity of the liquid in an increased shear force zone between the flow diverter and the first surface or the second surface such that liquid passing between the flow diverter and the filter applies a greater shear force on the first surface or the second surface than liquid in an absence of the flow diverter.

2. The dishwasher of claim 1 wherein the housing is remote from the tub of the dishwasher.

3. The dishwasher of claim 1 wherein the flow diverter is fixed.

4. The dishwasher of claim 1, further comprising a second flow diverter overlying and spaced from an other of the first surface or the second surface to define an other gap through which at least some of the liquid passes as the liquid flows through the recirculation flow path.

5. The dishwasher of claim 1, further comprising a recirculation pump including an impeller and wherein the impeller is operably coupled to the filter to rotate the filter.

6. The dishwasher of claim 5 wherein the filter further comprises a sheet or screen and the sheet or screen defines the first surface and the second surface.

7. The dishwasher of claim 6 wherein the filter further comprises an end body extending from the second end of the sheet or screen and the end body is coupled to the impeller.

8. The dishwasher of claim 7 wherein the impeller further comprises a set of pins extending from a distal end thereof.

9. The dishwasher of claim 8 wherein the set of pins are located within a set of corresponding openings in the end body.

10. A dishwasher, comprising
a tub at least partially defining a treating chamber;
a liquid spraying system configured to supply at least one spray of liquid into the treating chamber;
a liquid recirculation system, including a recirculation pump having an impeller, the liquid recirculation system configured to fluidly couple the treating chamber to the liquid spraying system and defining a recirculation flow path;
a liquid filtering system, comprising:
  a housing defining an enclosed filter chamber and configured to be fluidly coupled to the recirculation flow path;
  a filter located within the housing and mounted to the impeller, the filter having a first end axially spaced from a second end, where the second end is larger in diameter than the first end, and defines a cone-shaped filter that encloses a hollow interior, the filter having a first surface and a second surface, the filter being positioned within the recirculation flow path to filter soils from liquid flowing through the recirculation flow path as the liquid passes through the filter from the first surface to the second surface and where the filter fluidly divides the enclosed filter chamber into a first part that contains filtered soil particles and a second part that excludes filtered soil particles; and
  a flow diverter spaced apart from the first surface to define a gap through which at least some of the liquid passes as the liquid flows through the recirculation flow path;
wherein during operation of the recirculation pump the enclosed filter chamber is configured to be filled with liquid and rotation of the impeller causes rotation of the filter, which is configured to create a rotational flow of liquid within the enclosed filter chamber about at least the first surface to create an increase in angular velocity of the liquid in an increased shear force zone between the flow diverter and the first surface such that liquid passing between the flow diverter and the filter applies a greater shear force on the first surface than liquid in an absence of the flow diverter.

11. The dishwasher of claim 10 wherein the impeller further comprises at least one pin extending from a distal end thereof.

12. The dishwasher of claim 11 wherein the filter is mounted to the at least one pin.

13. The dishwasher of claim 11 wherein the filter further comprises an end body having at least one opening extending from the second end and the at least one pin extends through the at least one opening.

14. The dishwasher of claim 13 wherein the impeller includes a set of pins spaced about the impeller and the end body includes a set of spaced openings complementary to the set of pins.

15. The dishwasher of claim 10, further comprising a second flow diverter overlying and spaced from at least a portion of the second surface to form a second increased shear force zone there between to apply a greater shear force on the second surface than liquid in an absence of the second flow diverter.

16. The dishwasher of claim 15 wherein the filter further comprises a second end body extending radially inward at the first end and having a central opening therein.

17. The dishwasher of claim 16 wherein a portion of the second flow diverter extends through the central opening.

18. The dishwasher of claim 17 wherein the portion of the second flow diverter includes a shaft extension, which is operably coupled to the housing.

19. The dishwasher of claim 18, further comprising a bearing located between the shaft extension and the second end body.

20. The dishwasher of claim 10 wherein the housing is remote from the tub of the dishwasher.

* * * * *